US012802478B2

(12) United States Patent
Ichinose

(10) Patent No.: US 12,802,478 B2
(45) Date of Patent: Nov. 17, 2026

(54) EXTRACTION MODEL, INFORMATION PROCESSING APPARATUS, INFORMATION PROCESSING METHOD, AND PROGRAM

(71) Applicant: FUJIFILM Corporation, Tokyo (JP)

(72) Inventor: Akimichi Ichinose, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 477 days.

(21) Appl. No.: 18/479,108

(22) Filed: Oct. 1, 2023

(65) Prior Publication Data

US 2024/0119750 A1 Apr. 11, 2024

(30) Foreign Application Priority Data

Oct. 5, 2022 (JP) ................................ 2022-161178

(51) Int. Cl.
*G06V 30/18* (2022.01)
*G06T 7/00* (2017.01)
*G06V 10/25* (2022.01)

(52) U.S. Cl.
CPC ............ *G06V 30/18* (2022.01); *G06T 7/0012* (2013.01); *G06V 10/25* (2022.01);
(Continued)

(58) Field of Classification Search
CPC .... G06V 30/18; G06V 10/25; G06V 2201/07; G06V 10/82; G06V 20/62; G06V 30/186; G06V 30/19067; G06V 30/19073; G06V 30/1908; G06V 30/41; G06V 30/43; G06T 2207/20081; G06T 2207/20084;
(Continued)

(56) References Cited

U.S. PATENT DOCUMENTS

2010/0189366 A1* 7/2010 Iizuka .................... G16H 15/00
382/209
2018/0329892 A1* 11/2018 Lubbers ................. G06V 10/82
(Continued)

FOREIGN PATENT DOCUMENTS

JP 2017049975 3/2017
JP 2021157570 10/2021
WO WO-2021171732 A1 * 9/2021 ........... G06F 40/284

OTHER PUBLICATIONS

Kuang-Huei Lee et al., "Stacked Cross Attention for Image-Text Matching", arXiv:1803.08024v2 [cs.CV], Jul. 23, 2018, pp. 1-25.

*Primary Examiner* — Oneal R Mistry
*Assistant Examiner* — Duy Tran
(74) *Attorney, Agent, or Firm* — JCIPRNET

(57) ABSTRACT

A method of generating a language feature extraction model that causes a computer to extract a feature from a text related to an image, includes that a system performs machine learning using training data including a first image, first position information related to a region of interest in the first image, and a first text that describes the region of interest to input the first text into a first model, which is the language feature extraction model, to cause the first model to output a first feature amount, input the first image and the first feature amount into a second model to cause the second model to estimate the region of interest, and train the first model and the second model such that an estimated region of interest output from the second model matches the region of interest of a correct answer indicated by the first position information.

20 Claims, 20 Drawing Sheets

(52) U.S. Cl.
CPC ............... *G06T 2207/20081* (2013.01); *G06T 2207/20132* (2013.01); *G06T 2207/30064* (2013.01); *G06V 2201/07* (2022.01)

(58) Field of Classification Search
CPC . G06T 2207/20132; G06T 2207/30064; G06T 7/11; G06T 2211/441; G06T 2207/30; G16H 50/20; G16H 30/40; G16H 50/70
See application file for complete search history.

(56) References Cited

U.S. PATENT DOCUMENTS

| | | | | |
|---|---|---|---|---|
| 2018/0365834 | A1* | 12/2018 | Li | G06N 20/00 |
| 2021/0406615 | A1* | 12/2021 | Rao | G06F 18/241 |
| 2021/0406619 | A1* | 12/2021 | Lv | G06F 16/3344 |
| 2022/0004719 | A1* | 1/2022 | Ozeki | G06F 18/214 |
| 2022/0300706 | A1* | 9/2022 | Ma | G06N 3/09 |

* cited by examiner

EXTRACTION MODEL, INFORMATION PROCESSING APPARATUS, INFORMATION PROCESSING METHOD, AND PROGRAM

CROSS-REFERENCE TO RELATED APPLICATION

The present application claims priority under 35 U.S.C § 119(a) to Japanese Patent Application No. 2022-161178 filed on Oct. 5, 2022, which is hereby expressly incorporated by reference, in its entirety, into the present application.

BACKGROUND OF THE INVENTION

1. Field of the Invention

The present disclosure relates to a method of generating a language feature extraction model, an information processing apparatus, an information processing method, and a program, and more particularly to a natural language processing technique and a machine learning technique of handling a text related to an image.

2. Description of the Related Art

In recent years, various types of artificial intelligence (AI) in which a text as language information is input has been actively researched and developed, and commercialization is also progressing. For example, a chatbot or automatic sentence summarization AI is a typical example. In a case of general AI that obtains a desired output for a text input, a plurality of sets of pairs (data sets) of the text used for the input and correct answer information to be output in a case where the text is input may be prepared, and an AI model may be caused to learn using a dataset including the plurality of pairs.

A method of extracting respective feature amounts from both an image and a text to estimate a relationship between the image and the text is disclosed in Kuang-Huei Lee, Xi Chen, Gang Hua, Houdong Hu, and Xiaodong He, "Stacked Cross Attention for Image-Text Matching" <https://openaccess.thecvf.com/content ECCV 2018/papers/Kuang-Huei_Lee_Stacked_Cross_Attention_ECCV_2018paper.pdf>, <https://arxiv.org/pdf/1803.08024>.

Further, JP2017-049975A discloses a slide summarization device that extracts an image and text data for each page from a slide material and calculates a score value for each page, based on an image feature amount for each page calculated based on a data amount of the extracted image and a text feature amount of the page calculated based on an appearance frequency of a word included in the extracted text data, to select pages such that a total score value of the pages selected from the slide materials is maximized.

JP2021-157570A discloses a similar image search system comprising an appearance information acquisition unit that acquires appearance information indicating an appearance of an image, an appearance feature extraction unit that extracts an appearance feature amount indicating an appearance feature of the image by using the appearance information of the image and an appearance feature extraction model, a classification information acquisition unit that acquires classification information indicating image classification, a classification text feature extraction unit that extracts a classification text feature amount indicating a feature of a wording indicating the image classification using the classification information of the image and a classification text feature extraction model, and an overall feature extraction unit that extracts an overall feature amount that is an overall image feature in the image using the appearance feature amount of the image, the classification text feature amount, and a multimodal model.

SUMMARY OF THE INVENTION

However, in the method described in Kuang-Huei Lee, Xi Chen, Gang Hua, Houdong Hu, and Xiaodong He, "Stacked Cross Attention for Image-Text Matching" <https://openaccess.thecvf.com/content ECCV 2018/papers/Kuang-Huei_Lee_Stacked_Cross_Attention_ECCV_2018paper.pdf>, <https://arxiv.org/pdf/1803.08024>, a large number of pairs of an image including a target region and a corresponding text are required to perform learning for model. Further, in recent years, in addition to the general request for the development of AI, there is an increasing request for extracting a feature amount of text data (language information) and converting the extracted feature amount into a feature vector. The text feature vector is a numerical vector indicating a text feature. With the conversion of the text into the feature vector, for example, it can be used for various purposes such as creation of AI that specifies an object in an image indicated by the text from an image and a text related to the image or searching for a text in which a content similar to a certain text is described.

For example, in medical image diagnosis, a large number of image-interpretation reports (text data) including finding sentences created by a doctor by interpreting an image captured by a computed tomography (CT) apparatus or the like are accumulated as past data, and many attempts have been made to assist and improve the efficiency of the diagnostic work of doctors by utilizing such data. In a case where texts such as finding sentences included in such an image-interpretation report can be appropriately converted into the feature vector, it can be used for various purposes such as searching for a similar report in the past or grouping of similar reports.

This is, so to speak, sharing of roles of AI and is an AI system that realizes a target task by a combination of feature extraction AI that generates a feature vector from language information and purpose-specific AI that receives an input of a language feature vector and performs processing such as discrimination, classification, or estimation (prediction) of interest. In order to realize such a role-sharing AI system, it is desired to realize a general-purpose feature extraction AI generating a useful feature vector that can be used for processing for various purposes.

However, in a case where a configuration is considered in which the feature extraction AI is combined with the purpose-specific AI that performs target processing using the extracted feature vector, whether or not the feature extraction AI realized by machine learning can calculate a reasonable feature vector is a black box for AI developers and control thereof is difficult. A model created by machine learning depends on a dataset used for learning (training). In order to increase the general-purpose properties of the model, a large amount of data that may actually be input are usually required to be comprehensively prepared as learning data.

That is, in order to generate a language feature extraction AI that may output a reasonable language feature vector that can produce a result with good accuracy in line with a final target task, a large number of pairs of a text and correct answer data (here, correct answer feature vector) corresponding to the text are usually required. A mechanism by which the language feature extraction AI converts the text into the feature vector is a so-called "black box", and it is not possible to describe what kind of feature vector is calculated based on what kind of standard. Thus, a large number of learning data are required for a reasonable AI.

On the other hand, it is difficult for a human to prepare the correct answer feature vector indicating a feature of a certain text as the correct answer data.

The present disclosure has been made in view of such circumstances, and an object of the present disclosure is to provide a method of generating a language feature extraction model, an information processing apparatus, an information processing method, and a program capable of extracting a feature amount including a feature of information about a position in an image from a text related to the image and converting the extracted feature amount into a feature vector.

A method of generating a language feature extraction model according to a first aspect of the present disclosure is a method of generating a language feature extraction model that causes a computer to execute processing of extracting a feature from a text related to an image comprising, by a system including one or more processors, with performing of machine learning using a plurality of pieces of training data including a first image, first position information related to a region of interest in the first image, and a first text that describes the region of interest to input the first text into a first model to cause the first model to output a first feature amount representing a feature of the first text, input the first image and the first feature amount into a second model different from the first model to cause the second model to estimate the region of interest in the first image, and train the first model and the second model such that an estimated region of interest output from the second model matches the region of interest of a correct answer indicated by the first position information, generating the first model, which is the language feature extraction model.

According to the first aspect, the first model is trained to output, from the input text, the feature amount including the feature of the information about the position of the region of interest in the image that the text refers to. That is, the language feature extraction model generated by the first aspect can output, from the input text, the feature amount in which the feature related to the position of the region of interest in the image is embedded. For example, in processing of specifying the text related to the region of interest in the image or extracting a similar text, the feature amount generated by the language feature extraction model may be useful data.

According to the first aspect, in a case where the first model and the second model are trained, a correct-answer feature amount that is correct answer data for the output of the first model is not required to be prepared and it is possible to cause the first model to learn a relationship between the text and the position of the region of interest in the image referred to in the text. According to the first aspect, even in a case where a relatively small amount of learning data is provided, it is possible to generate a high-performance language feature extraction model that may output, from the input text, the feature amount including the feature of the position of the region of interest in the image. The term "model" is essentially a program. The method of generating a language feature extraction model is understood as a method of producing the language feature extraction model.

In the method of generating a language feature extraction model according to a second aspect, in the method of generating a language feature extraction model according to the first aspect, the system may be configured to include, using a third model that receives inputs of an image feature amount extracted from the image and a language feature amount extracted from the text and outputs a degree of association between the two feature amounts, in the machine learning, inputting of a second feature amount extracted from the first image and the first feature amount into the third model to cause the third model to estimate a degree of association between the first image and the first text, and training of the first model and the third model such that an estimated degree of association output from the third model matches a degree of association of a correct answer.

In the method of generating a language feature extraction model according to a third aspect, in the method of generating a language feature extraction model according to the second aspect, the system may be configured to include, using a fourth model that extracts the second feature amount from the input first image, in the machine learning, inputting of the first image and the position information into the fourth model to cause the fourth model to output the second feature amount, and training of the first model, the third model, and the fourth model such that the estimated degree of association output from the third model matches the degree of association of the correct answer.

In the method of generating a language feature extraction model according to a fourth aspect, in the method of generating a language feature extraction model according to the first aspect, the system may be configured to include, using a fifth model that receives an input of a language feature amount extracted from each of a plurality of texts and outputs a degree of association between the plurality of the texts, in the machine learning, inputting of a third feature amount, which is extracted, by the first model, from a second text different from the first text by inputting the second text into the first model, and the first feature amount into the fifth model to cause the fifth model to estimate a degree of association between the first text and the second text, and training of the first model and the fifth model such that an estimated degree of association output from the fifth model matches a degree of association of a correct answer.

In the method of generating a language feature extraction model according to a fifth aspect, in the method of generating a language feature extraction model according to any one of the first to fourth aspects, the text and the first text may be structured texts.

In the method of generating a language feature extraction model according to a sixth aspect, in the method of generating a language feature extraction model according to the fourth aspect, the second text may be a structured text.

In the method of generating a language feature extraction model according to a seventh aspect, in the method of generating a language feature extraction model according to any one of the first to sixth aspects, the system may be configured to include performing of processing of displaying the region of interest estimated by the second model.

In the method of generating a language feature extraction model according to an eighth aspect, in the method of generating a language feature extraction model according to any one of the first to seventh aspects, the position information may be configured to include coordinate information that specifies a position of the region of interest in the first image.

In the method of generating a language feature extraction model according to a ninth aspect, in the method of generating a language feature extraction model according to any one of the first to eighth aspects, the first image may be a cropped image including the position information.

An information processing apparatus according to a tenth aspect comprises one or more storage devices that store a program including the language feature extraction model generated by the method of generating a language feature extraction model according to any one of the first to ninth aspects, and one or more processors that execute the program.

An information processing apparatus according to an eleventh aspect comprises one or more processors, and one or more storage devices that store a command executed by the one or more processors, in which the one or more processors are configured to acquire a text that describes a region of interest in an image and execute processing of inputting the text into a first model to cause the first model to output a language feature amount representing a feature of the text, and the first model is a model obtained by performing machine learning using a plurality of pieces of training data including a first image for training, first position information related to a region of interest in the first image, and a first text that describes the region of interest to input the first text into the first model to cause the first model to output a first feature amount representing a feature of the first text and inputting of the first image and the first feature amount into a second model different from the first model to cause the second model to estimate the region of interest in the first image, and train the first model and the second model such that an estimated region of interest output from the second model matches the region of interest of a correct answer indicated by the first position information.

In the information processing apparatus according to a twelfth aspect, in the information processing apparatus according to the tenth aspect or the eleventh aspect, the one or more processors may be configured to input an image feature amount extracted from a second image and a language feature amount extracted from the text into a third model to cause the third model to output a degree of association between the second image and the text.

In the information processing apparatus according to a thirteenth aspect, in the information processing apparatus according to the twelfth aspect, the one or more processors may be configured to acquire the second image and second position information related to a region of interest in the second image, and input the second image and the second position information into a fourth model to cause the fourth model to output the image feature amount.

In the information processing apparatus according to a fourteenth aspect, in the information processing apparatus according to the tenth aspect or the eleventh aspect, the one or more processors may be configured to input a language feature amount extracted from each of a plurality of texts by the first model into a fifth model to cause the fifth model to output a degree of association between the plurality of the texts.

In the information processing apparatus according to a fifteenth aspect, in the information processing apparatus according to any one of the tenth aspect to the fourteenth aspect, the text and the first text may be structured texts.

An information processing method according to a sixteenth aspect comprising, by one or more processors, acquiring a text that describes a region of interest in an image and executing processing of inputting the text into a first model to cause the first model to output a language feature amount representing a feature of the text, in which the first model is a model obtained by performing machine learning using training data including a first image for training, a first text that describes a region of interest in the first image, and first position information related to the region of interest in the first image to input the first text into the first model to cause the first model to output a first feature amount representing a feature of the first text and inputting of the first image and the first feature amount into a second model different from the first model to cause the second model to estimate the region of interest in the first image, and train the first model and the second model such that the region of interest estimated by the second model matches the region of interest indicated by the first position information.

The information processing method according to the sixteenth aspect can be configured to include the same specific aspect as that of the information processing apparatus according to any one aspect of the second to fifteenth aspects.

A program according to a seventeenth aspect is a program that causes a computer to realize a function of extracting a feature from a text related to an image, the program causing the computer to realize a function of acquiring a text that describes a region of interest in the image and a function of inputting the text into a first model to cause the first model to output a language feature amount representing a feature of the text, in which the first model is a model obtained by performing machine learning using training data including a first image for training, first position information related to a region of interest in the first image, and a first text that describes the region of interest in the first image to input the first text into the first model to cause the first model to output a first feature amount representing a feature of the first text and inputting of the first image and the first feature amount into a second model different from the first model to cause the second model to estimate the region of interest in the first image, and train the first model and the second model such that an estimated region of interest output from the second model matches the region of interest indicated by the first position information.

The program according to the seventeenth aspect can be configured to include the same specific aspect as that of the information processing apparatus according to any one aspect of the second to fifteenth aspects.

According to the present disclosure, it is possible to generate the language feature extraction model that may extract, from the text related to the image, the feature amount including the feature related to the position of the region of interest in the image. In the method of generating a language feature extraction model of the present disclosure, the feature amount as correct answer data in machine learning is not required to be provided, the learning of the relationship between the text and the position of the region of interest in the image is possible even with a relatively small amount of learning data, and thus it is possible to generate the language feature extraction model that may extract a useful feature amount from the input text.

With use of the language feature extraction model generated by the method of the present disclosure, it is possible to provide the feature amount in which the position information in the image is added. The feature amount generated by the language feature extraction model of the present disclosure can be used for processing for various purposes such as estimation of the correspondence relationship between the image and the text and discrimination of relevance between the texts.

DESCRIPTION OF THE PREFERRED EMBODIMENTS

Hereinafter, preferred embodiments of the present invention will be described with reference to accompanying drawings.

<<Example of Data Used for Machine Learning>>

Figure 1:
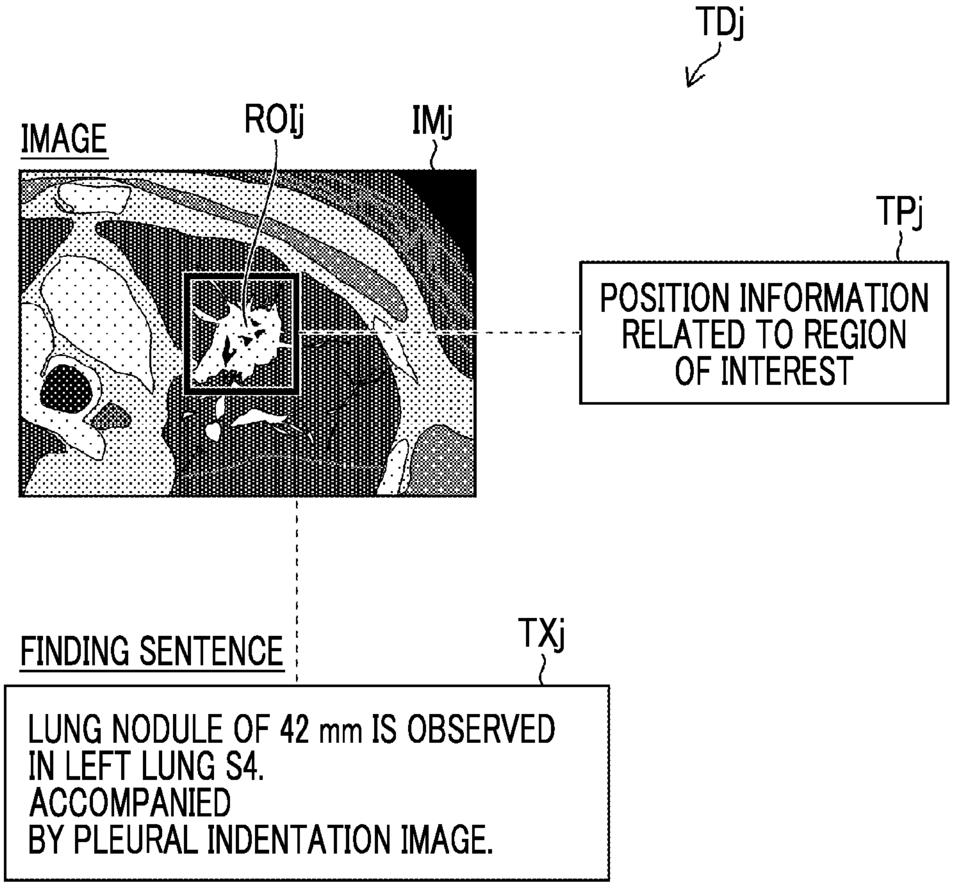
FIG. 1 is an explanatory diagram showing an example of data for learning (training) used in a method of generating a language feature extraction model according to an embodiment of the present disclosure.

FIG. 1 is an explanatory diagram showing an example of data for learning (training) used in a method of generating a language feature extraction model according to the embodiment of the present disclosure. Here, an example of training data TDj including an image IMj used for medical image diagnosis, position information TPj related to a region of interest ROIj in the image IMj, and a finding sentence TXj describing the region of interest ROIj will be described. The term "training data" is synonymous with "learning data". The image IMj, the position information TPj related to the region of interest ROIj, and the finding sentence TXj are associated with each other. The subscript j represents an index number as an identification reference numeral of an associated data set. The region of interest ROIj in the medical image diagnosis is mainly a lesion region.

The image IMj may be, for example, a CT image captured by a CT apparatus. FIG. 1 illustrates a CT image obtained by capturing a chest region including a lung of a subject, but a portion to be captured is not limited to the lung and may be a portion including other organs such as the heart, liver, kidney, and brain. Further, an imaging apparatus that captures the subject to generate a medical image is not limited to the CT apparatus and may be other types of modalities such as an MRI apparatus, a PET apparatus, and an endoscopic apparatus. The image IMj may be a three-dimensional image configured of three-dimensional data obtained by continuously capturing a two-dimensional slice tomographic image or may be a two-dimensional image. The term "image" includes meaning of image data.

The position information TPj related to the region of interest ROIj is information that may specify a position of the ROIj in the image IMj. The position information TPj may be coordinate information indicating coordinates in the image IMj, may be information indicating a region or a range in the image IMj, or may be a combination of these pieces of information. The position information TPj may be information provided as annotation information to the image IMj or may be meta information attached to the image IMj such as a digital imaging and communications in medicine (DICOM) tag.

For example, the position information TPj may be coordinate information of four corners of a rectangle surrounding a range of ROIj, coordinate information of a center of gravity of ROIj, or a segmentation mask image in which a region of ROIj is specified in a pixel unit. Alternatively, in a case where the image IMj itself is a cropped image obtained by cutting out the region of interest ROIj, it is understood that in a case where an image region cut out as the cropped image can be specified, the cropped image itself includes the position information TPj and the image IMj is provided with the position information TPj.

The image IMj is an example of a "first image" in the present disclosure, and the position information TPj is an example of "first position information" in the present disclosure.

The finding sentence TXj may be, for example, a sentence described in an image-interpretation report. The finding sentence TXj is an example of a "first text" in the present disclosure. Here, as the finding sentence TXj, a text which is unstructured data in a free description type sentence format before being structured is illustrated, but structured data structured by structure analysis of the sentence may be also used.

Such training data TDj can be generated by sampling appropriate data from a database in which pieces of data of medical images and image-interpretation reports related to past examination cases in a medical institution such as a hospital are accumulated and stored in an associated manner.

First Embodiment: Example 1 of Method of Generating Language Feature Extraction Model

[Configuration Example of Machine Learning Device]

Figure 2:
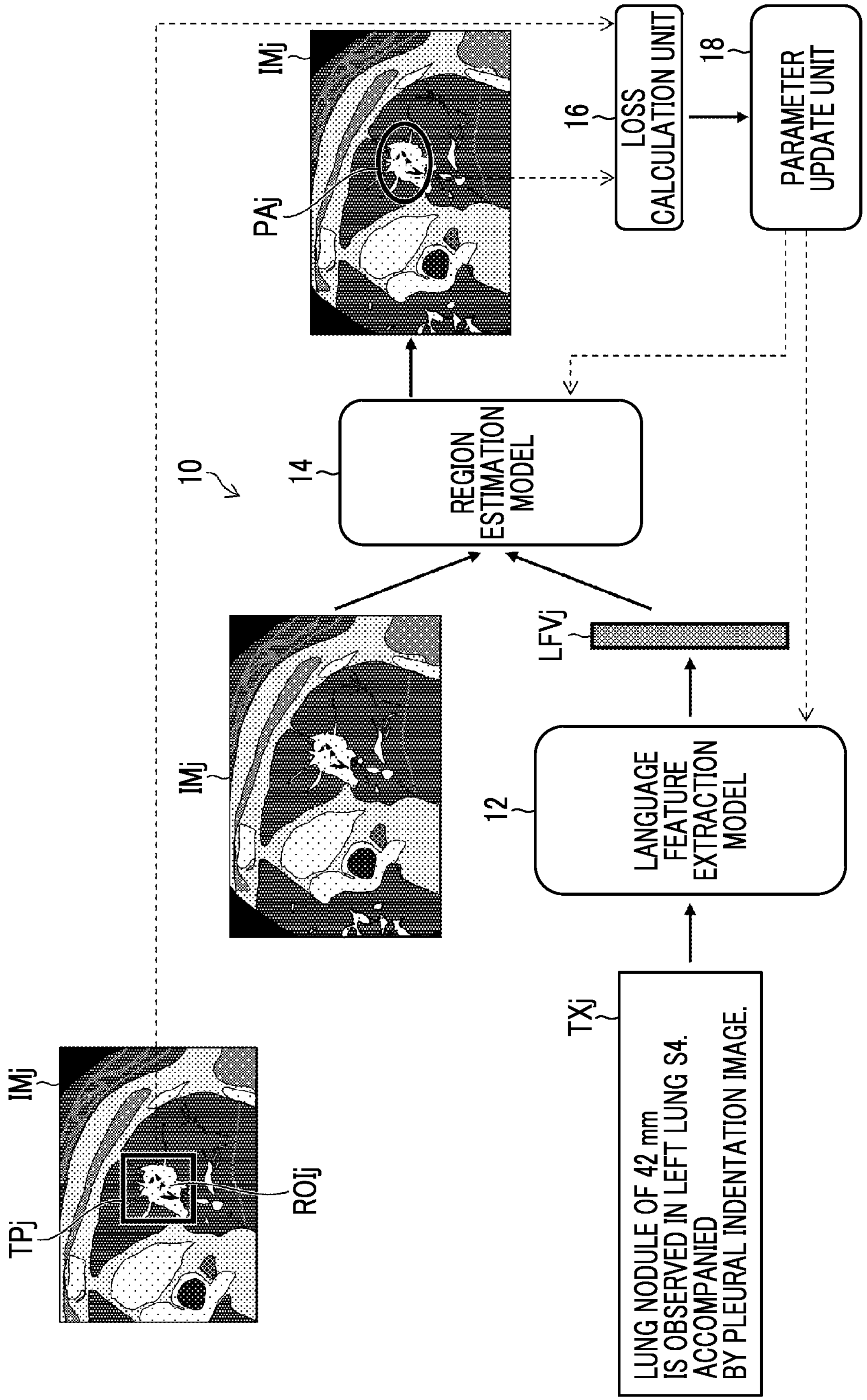
FIG. 2 is a block diagram schematically showing a functional configuration of a machine learning device according to a first embodiment.

FIG. 2 is a block diagram schematically showing a functional configuration of a machine learning device 10 according to a first embodiment. The machine learning device 10 includes a language feature extraction model 12 which is a first learning model, a region estimation model 14 which is a second learning model, a loss calculation unit 16, and a parameter update unit 18. A function of each unit of the machine learning device 10 may be realized by a combination of hardware and software of a computer. The machine learning device 10 may be configured by a computer system including one or a plurality of computers. The machine learning device 10 is an example of a "system" in the present disclosure.

For example, a natural language processing model called bidirectional encoder representations from transformers (BERT) is applied to the language feature extraction model 12. The language feature extraction model 12 receives an input of the finding sentence TXj which is a text, extracts a feature amount corresponding to the input finding sentence TXj, and outputs a finding feature LFVj which is a language feature vector (finding feature vector). The language feature extraction model 12 is an example of a "first model" in the present disclosure. The finding feature LFVj is an example of a "first feature amount" in the present disclosure.

For example, a convolutional neural network (CNN) is applied to the region estimation model 14. The region estimation model 14 receives inputs of the image IMj and the language feature vector LFVj, estimates the lesion region in the image IMj referred to in the input finding sentence TXj, and outputs estimated region information PAj indicating a position of the estimated lesion region. The estimated region information PAj may be, for example, coordinate information that specifies a position of a rectangle (bounding box) surrounding a range of the estimated lesion region, or a segmentation mask image that specifies the estimated lesion region in a pixel unit. The region estimation model 14 is an example of a "second model" in the present disclosure. The lesion region indicated by the estimated region information PAj output from the region estimation model 14 is an example of an "estimated region of interest" in the present disclosure.

The loss calculation unit 16 calculates a loss indicating an error between the estimated lesion region indicated by the estimated region information PAj output from the region estimation model 14 and the region of interest ROIj of a correct answer indicated by the position information TPj of a correct answer associated with the image IMj.

The parameter update unit 18 calculates, based on the loss calculated by the loss calculation unit 16, an update amount of a parameter of each model of the region estimation model 14 and the language feature extraction model 12 such that the loss becomes small and updates the parameter of each model according to the calculated update amount. The parameter of each model includes a filter coefficient (weight for coupling between nodes) of a filter used for processing each layer of the neural network, a node bias, and the like. The parameter update unit 18 optimizes the parameter of each model by, for example, a method such as a stochastic gradient descent (SGD) method.

Figure 3:
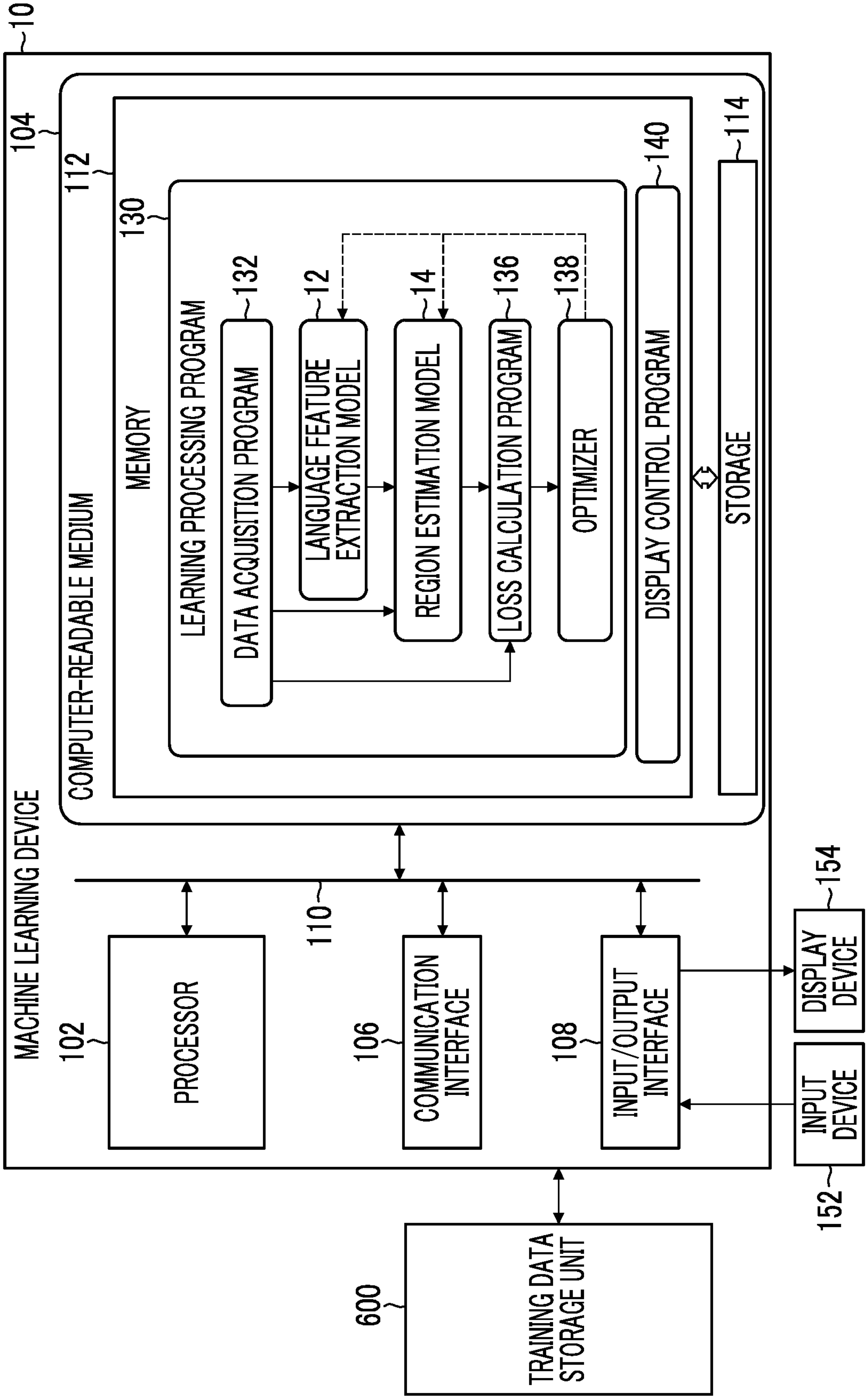
FIG. 3 is a block diagram showing an example of a hardware configuration of the machine learning device according to the first embodiment.

FIG. 3 is a block diagram showing an example of a hardware configuration of the machine learning device 10. The machine learning device 10 comprises a processor 102, a computer-readable medium 104, which is a non-transitory tangible object, a communication interface 106, an input/output interface 108, and a bus 110. The processor 102 is connected to the computer-readable medium 104, the communication interface 106, and the input/output interface 108 via the bus 110.

A form of the machine learning device 10 is not particularly limited and may be a server, a workstation, a personal computer, or the like.

The processor 102 includes a central processing unit (CPU). The processor 102 may include a graphics processing unit (GPU). The computer-readable medium 104 includes a memory 112 that is a main storage device and a storage 114 that is an auxiliary storage device. For example, the computer-readable medium 104 may be a semiconductor memory, a hard disk drive (HDD) device or a solid state drive (SSD) device, or a combination of a plurality thereof The computer-readable medium 104 is an example of a "storage device" according to the present disclosure.

The machine learning device 10 may further comprise an input device 152 and a display device 154. The input device 152 is configured with, for example, a keyboard, a mouse, a multi-touch panel, another pointing device, a voice input device, or an appropriate combination thereof. The display device 154 is configured with, for example, a liquid crystal display, an organic electro-luminescence (OEL) display, a projector, or an appropriate combination thereof. The input device 152 and the display device 154 are connected to the processor 102 via the input/output interface 108.

The machine learning device 10 may be connected to an electric telecommunication line (not shown) via the communication interface 106. The electric telecommunication line may be a wide area communication line, a local area communication line, or a combination thereof.

The machine learning device 10 is communicably connected to an external device such as a training data storage unit 600 via the communication interface 106. The training data storage unit 600 includes a storage in which a training dataset including a plurality of pieces of training data TDj is stored. The training data storage unit 600 may be constructed in the storage 114 in the machine learning device 10.

A plurality of programs, pieces of data, and the like including a learning processing program 130 and a display control program 140 are stored in the computer-readable medium 104. The term "program" includes the concept of a program module. The processor 102 functions as various processing units by executing a command of the program stored in the computer-readable medium 104.

The learning processing program 130 includes a command to acquire the training data TDj and execute the learning processing of the language feature extraction model 12 and the region estimation model 14. That is, the learning processing program 130 includes a data acquisition program 132, a language feature extraction model 12, a region estimation model 14, a loss calculation program 136, and an optimizer 138. The data acquisition program 132 includes a command to execute the processing of acquiring the training data TDj from the training data storage unit 600.

The loss calculation program 136 includes a command to execute the processing of calculating a loss indicating an error between the estimated region information PAj indicated by the information indicating the position of the lesion region output from the region estimation model 14 and the position information TPj of the correct answer corresponding to the finding sentence TXj input to the language feature extraction model 12. The optimizer 138 includes a command to execute the processing of calculating the update amount of the parameter of each model of the region estimation model 14 and the language feature extraction model 12 from the calculated loss, and of updating the parameter of each model.

The display control program 140 includes a command to generate a signal for display required for display output to a display device 154 and execute display control of the display device 154.

[Outline of Machine Learning Method]

Figure 4:
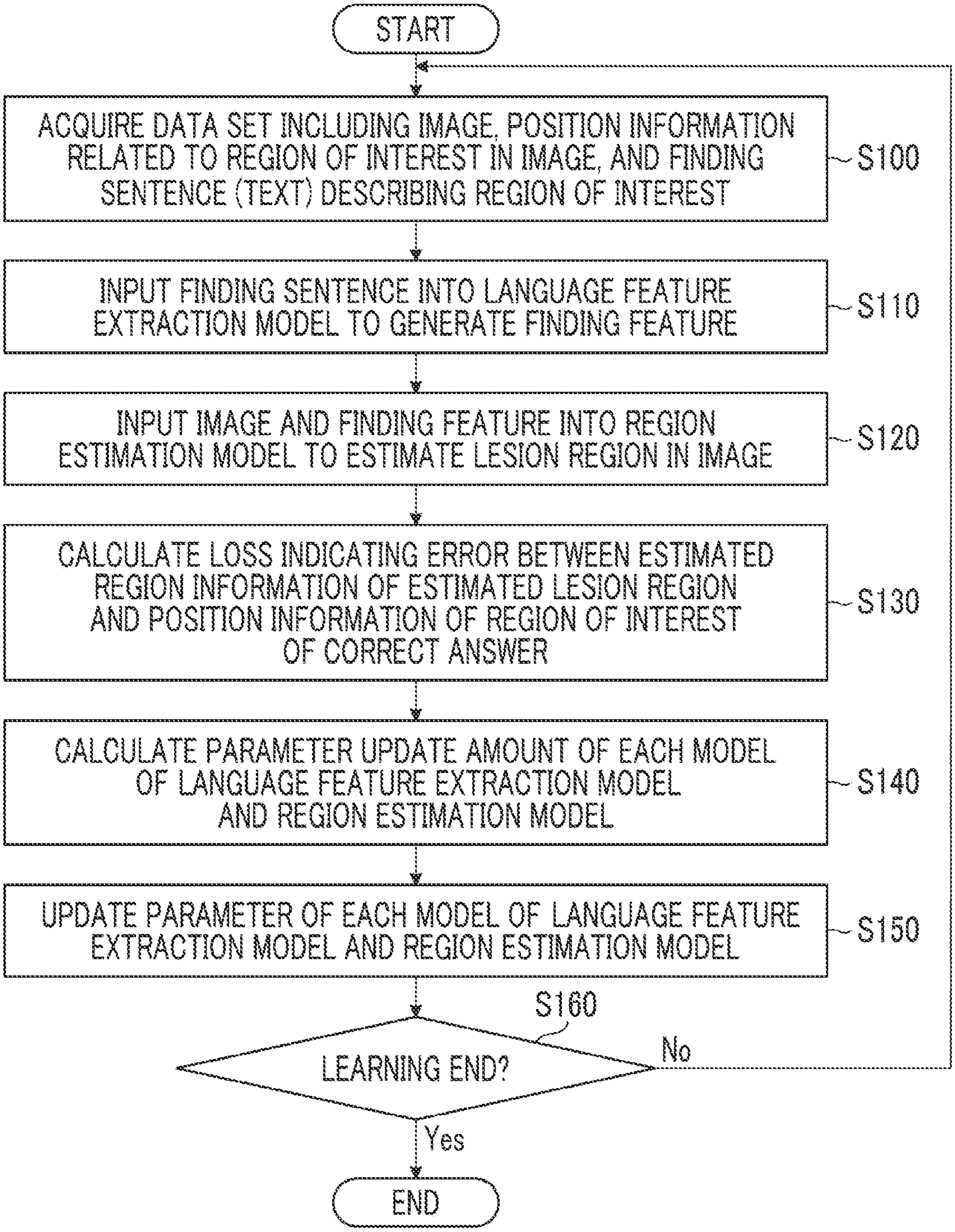
FIG. 4 is a flowchart showing an example of a machine learning method executed by the machine learning device according to the first embodiment.

FIG. 4 is a flowchart showing an example of a machine learning method executed by the machine learning device 10 according to the first embodiment.

Before the flowchart of FIG. 4 is executed, a plurality of sets of the training data TDj, which is a set of data in which the image IMj for training, the finding sentence TXj which is a text describing a certain region of interest ROIj in the image IMj, and the position information TPj related to the region of interest ROIj are associated with each other, are prepared to prepare a dataset for training.

In step S100, the processor 102 acquires, from the dataset for training, a data set including the image IMj, the position information TPj related to the region of interest ROIj in the image IMj, and the finding sentence TXj describing the region of interest ROIj.

In step S110, the processor 102 inputs the finding sentence TXj into the language feature extraction model 12 and causes the language feature extraction model 12 to extract the finding feature LFVj indicating the feature amount of the finding sentence TXj to obtain an output of the finding feature LFVj from the language feature extraction model 12. The finding feature LFVj is expressed by the language feature vector obtained by converting the finding sentence TXj into the feature vector.

In step S120, the processor 102 inputs the finding feature LFVj output by the language feature extraction model 12 and the image IMj associated with the finding sentence TXj into the region estimation model 14 and causes the region estimation model 14 to estimate the region of interest (lesion region) in the image IMj referred to in the input finding sentence TXj. The region estimation model 14 outputs the estimated region information PAj estimated from the input finding feature LFVj and image IMj.

In step S130, the processor 102 calculates a loss indicating an error between the estimated region information PAj of the lesion region estimated by the region estimation model 14 and the position information TPj of the region of interest ROIj of the correct answer.

In step S140, the processor 102 calculates the parameter update amount of each model of the language feature extraction model 12 and the region estimation model 14 to minimize the loss.

In step S150, the processor 102 updates the parameter of each model of the language feature extraction model 12 and the region estimation model 14 in accordance with the calculated parameter update amount. The training of each model to minimize the loss means training of each model such that the estimated lesion region estimated by the region estimation model 14 matches the region of interest ROIj of the correct answer (such that error between the regions becomes small). The operations of steps S100 to S150 may be performed in a mini-batch unit.

After step S150, in step S160, the processor 102 determines whether or not to end the learning. An end condition of the learning may be determined based on a value of the loss or may be determined based on the number of updates of the parameter. As for a method based on the value of the loss, for example, the end condition of the learning may include that the loss converges within a prescribed range. Further, as for a method based on the number of updates, for example, the end condition of the learning may include that the number of updates reaches a prescribed number of times. Alternatively, a dataset for performance evaluation of the model may be prepared separately from the training data, and whether or not to end the learning may be determined based on an evaluation value using the data for evaluation.

In a case where No determination is made in a determination result in step S160, the processor 102 returns to step S100 and continues the learning processing. On the other hand, in a case where Yes determination is made in the determination result in step S160, the processor 102 ends the flowchart of FIG. 4.

The learned (trained) language feature extraction model 12 generated in this manner is a model that may receive the input of the finding sentence and output the finding feature (feature vector) in which the position information related to the lesion region (region of interest) in the image that the finding sentence refers to is embedded. That is, the information required to specify the position related to the lesion region in the image is embedded in the finding feature output by the language feature extraction model 12. The machine learning method executed by the machine learning device 10 can be understood as a method of generating the language feature extraction model 12 that outputs the language feature vector including the information specifying the position of the lesion region in the image described in the finding sentence, and is an example of a "method of generating language feature extraction model" in the present disclosure.

Second Embodiment: Use Example 1 of Language Feature Extraction Model

Figure 5:
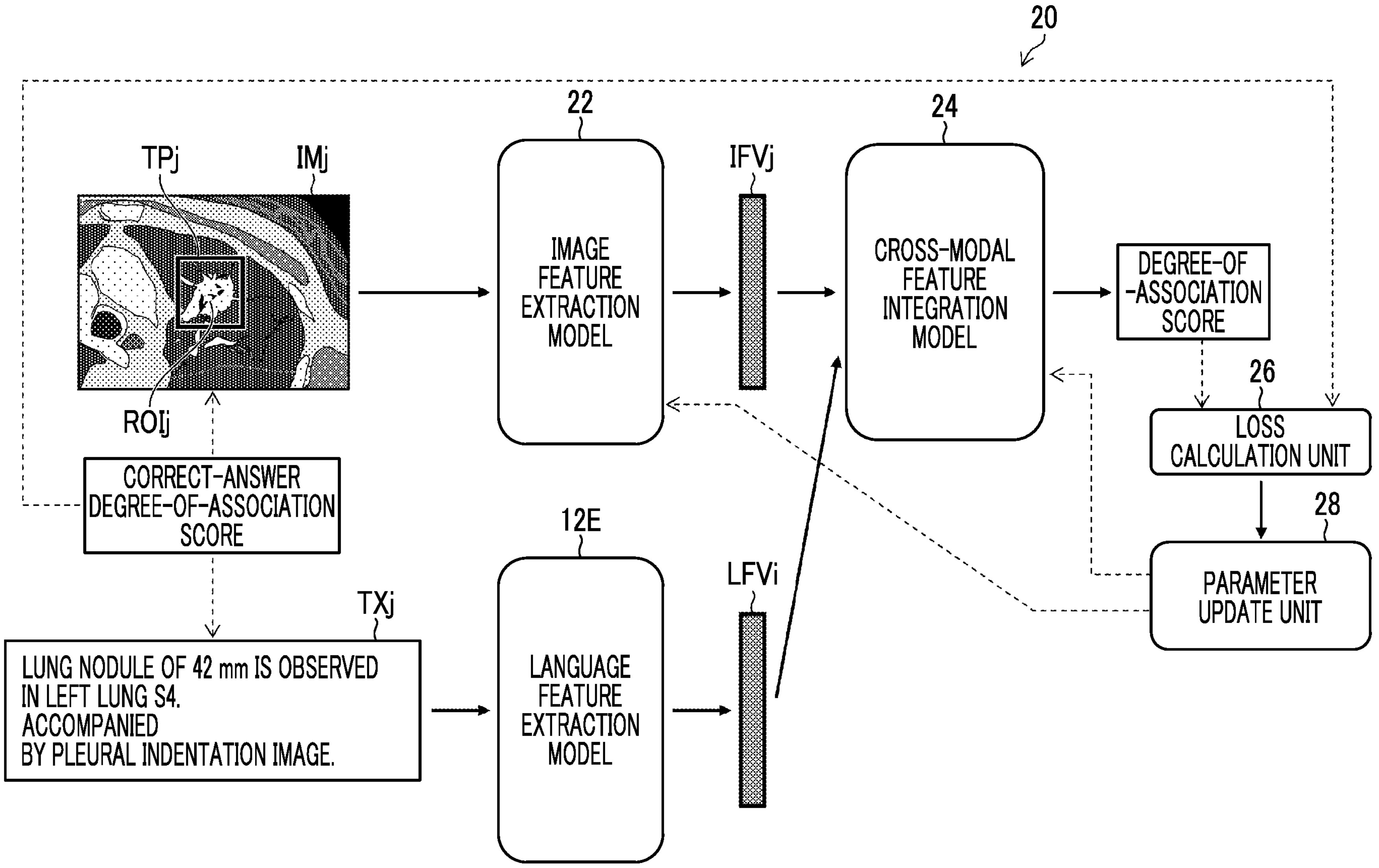
FIG. 5 is a block diagram schematically showing the functional configuration of the machine learning device using a learned language feature extraction model.

FIG. 5 is a block diagram schematically showing a functional configuration of a machine learning device 20 using a learned language feature extraction model 12E. The machine learning device 20 shown in FIG. 5 executes the learning processing for generating a cross-modal feature integration model 24 that discriminates a correspondence relationship between an image provided with position information related to a region of interest in the image and a finding sentence describing the region of interest.

The machine learning device 20 includes the language feature extraction model 12E, an image feature extraction model 22, the cross-modal feature integration model 24, a loss calculation unit 26, and a parameter update unit 28.

The dataset for training may be the same as the dataset used in the first embodiment. For example, CNN is applied to the image feature extraction model 22. The image feature extraction model 22 receives inputs of the image IMj and the position information TPj related to the region of interest ROIj in the image and outputs an image feature IFVj indicating the feature amount of the image IMj. The image feature IFVj may be expressed by an image feature vector obtained by converting the image IMj into a feature vector. The image feature IFVj may be a feature map of a plurality of channels.

The language feature extraction model 12E is a learned model trained to receive an input of a finding sentence TXi and output a corresponding finding feature LFVi. The finding sentence TXi input to the language feature extraction model 12E is not limited to a case where the finding sentence TXj is associated with the image IMj (i=j) and may also be a case where a finding sentence is not associated with the image IMj (i j).

The cross-modal feature integration model 24 receives inputs of the image feature IFVj and the finding feature LFVj, and outputs a degree-of-association score indicating the relevance between the two features. The degree-of-association score may be a numerical value indicating a degree of relevance or may be a numerical value in a range of 0 to 1 as "0" in a case where there is no relevance and "1" in a case where there is relevance to indicate a degree of certainty of the relevance.

The loss calculation unit 26 calculates a loss indicating an error between the degree-of-association score output from the cross-modal feature integration model 24 and the degree-of-association score of a correct answer. In a case where a combination of the image IMj and the finding sentence TXi (i=j) associated with the image IMj is input to the image feature extraction model 22 and the language feature extraction model 12E, a correct-answer degree-of-association score may be determined as "1". On the other hand, in a case where a combination of the image IMj and an irrelevant finding sentence TXi (i j) not associated with the image IMj is input to the image feature extraction model 22 and the language feature extraction model 12E, the correct-answer degree-of-association score may be determined as "0".

The parameter update unit 28 calculates the update amount of the parameter of each model of the cross-modal feature integration model 24 and the image feature extraction model 22 such that the loss calculated by the loss calculation unit 26 is minimized and updates the parameter of each model according to the calculated update amount.

A hardware configuration of the machine learning device 20 may be the same as the example shown in FIG. 3. The hardware configuration thereof includes the cross-modal feature integration model 24 instead of the region estimation model 14 of FIG. 3, and a loss function of the loss calculated by the loss calculation program 136 and a target model for which the parameter is updated by the optimizer 138 are different from the example of FIG. 3.

[Outline of Machine Learning Method]

Figure 6:
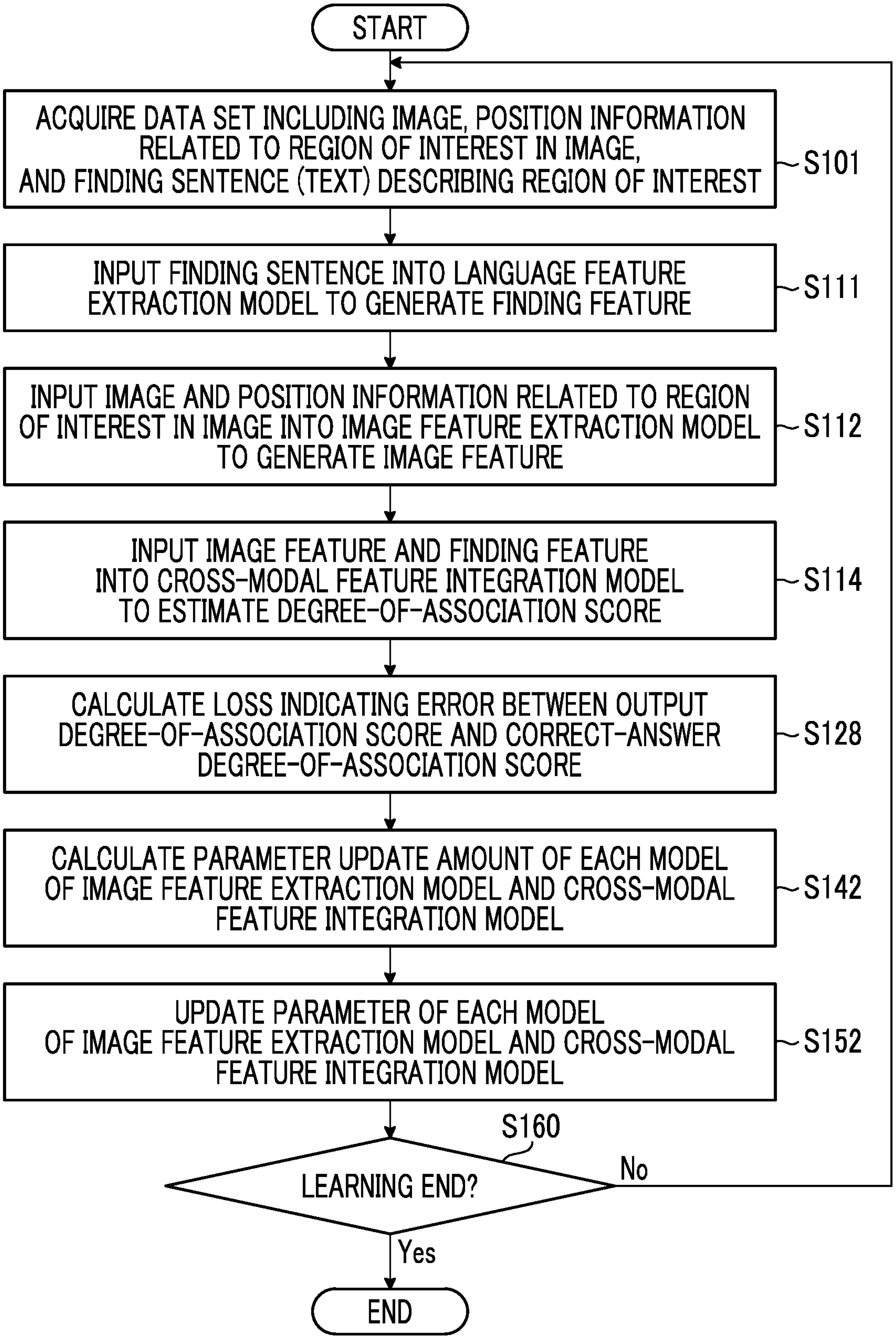
FIG. 6 is a flowchart showing an example of a machine learning method executed by a machine learning device according to a second embodiment.

FIG. 6 is a flowchart showing an example of a machine learning method executed by the machine learning device 20 according to a second embodiment. In step S101, the processor 102 acquires, from the dataset for training, a data set of the image IMj, the position information TPj related to the region of interest ROIj in the image IMj, and the finding sentence TXi describing a region of interest ROIi. The processor 102 acquires "1" as the correct-answer degree-of-association score in a case where i=j in the data set acquired in this case and acquires "0" as the correct-answer degree-of-association score in a case where in a case where i≠j.

In step S111, the processor 102 inputs the finding sentence TXi into the language feature extraction model 12E and causes the language feature extraction model 12E to extract the finding feature LFVi.

In step S112, the processor 102 inputs the image IMj and the position information TPj related to the region of interest ROIj in the image IMj into the image feature extraction model 22 and causes the image feature extraction model 22 to extract the image feature IFVj.

In step S114, the processor 102 inputs the image feature IFVj, which is output from the image feature extraction model 22, and the finding feature LFVi, which is output from the language feature extraction model 12E, into the cross-modal feature integration model 24 and causes the cross-modal feature integration model 24 to estimate the degree-of-association score. The image feature extraction model 22 is caused to extract the image feature IFVj.

Thereafter, in step S128, the processor 102 calculates a loss indicating an error between the degree-of-association score (estimated value) output from the cross-modal feature integration model 24 and the correct-answer degree-of-association score.

In step S142, the processor 102 calculates the parameter update amount of each model of the image feature extraction model 22 and the cross-modal feature integration model 24 such that the calculated loss is minimized.

In step S152, the processor 102 updates the parameter of each model of the image feature extraction model 22 and the cross-modal feature integration model 24 according to the calculated parameter update amount.

The operations of steps S101 to S152 shown in FIG. 6 may be performed in a mini-batch unit.

After step S152, in step S160, the processor 102 determines whether or not to end the learning.

In a case where No determination is made in a determination result in step S160, the processor 102 returns to step S101 and continues the learning processing. On the other hand, in a case where Yes determination is made in the determination result in step S160, the processor 102 ends the flowchart of FIG. 6.

With the learning of each model in this manner, it is possible to construct a degree-of-association determination AI that may accurately determine whether or not the input image corresponds to the finding sentence (whether or not there is relevance).

Figure 8:
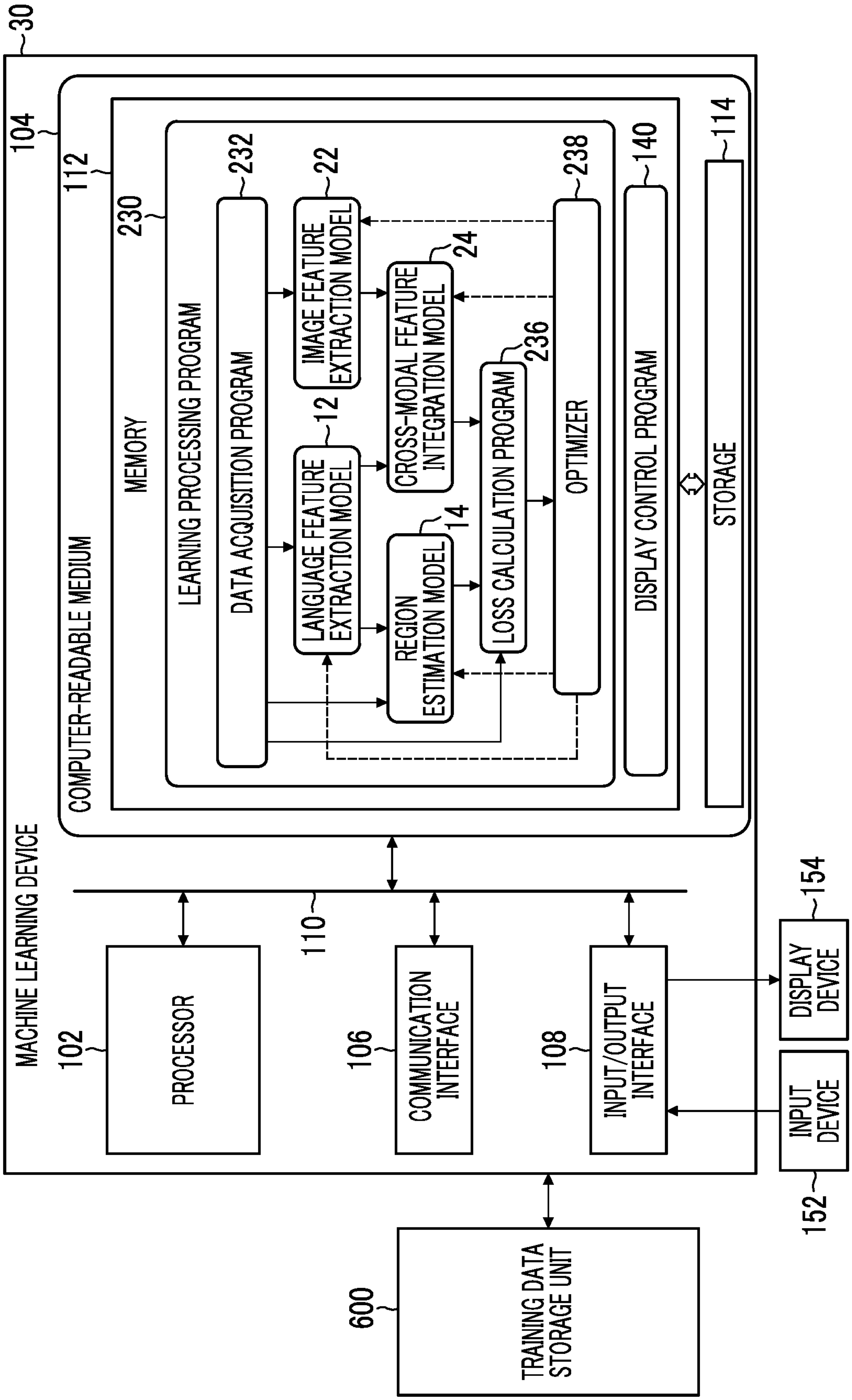
FIG. 8 is a block diagram showing an example of a hardware configuration of the machine learning device according to the third embodiment.
Figure 9:
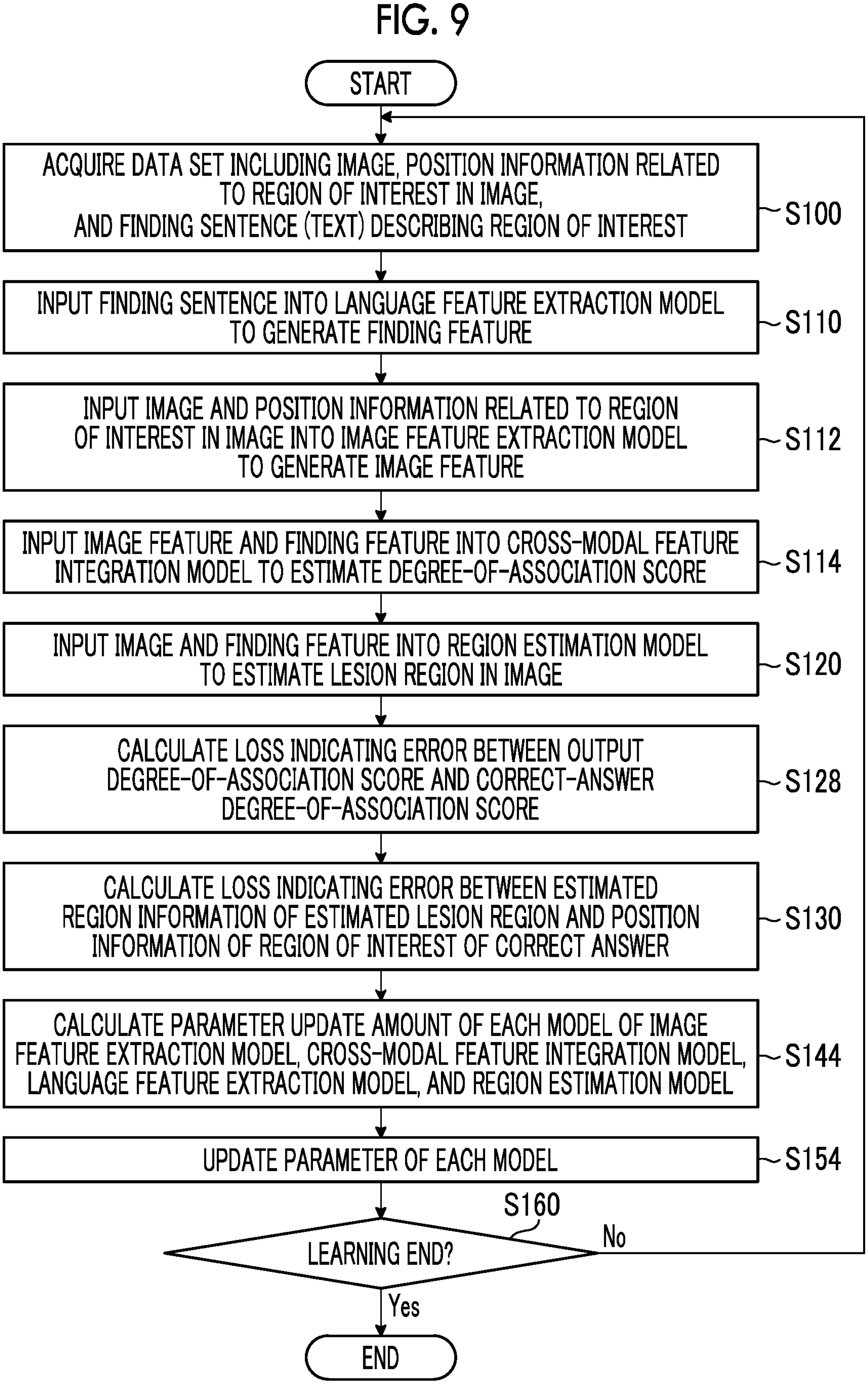
FIG. 9 is a flowchart showing an example of a machine learning method executed by the machine learning device according to the third embodiment.

Third Embodiment: Example 2 of Method of Generating Language Feature Extraction Model In the above-described second embodiment, the parameter of the learned language feature extraction model 12E is fixed. However, a configuration may be employed in which the machine learning method described in the first embodiment is combined with the machine learning method described in the second embodiment and the four models of the language feature extraction model 12, the region estimation model 14, the image feature extraction model 22, and the cross-modal feature integration model 24 are caused to learn at the same time. An example thereof is shown in FIGS. 7 to 9.

Figure 7:
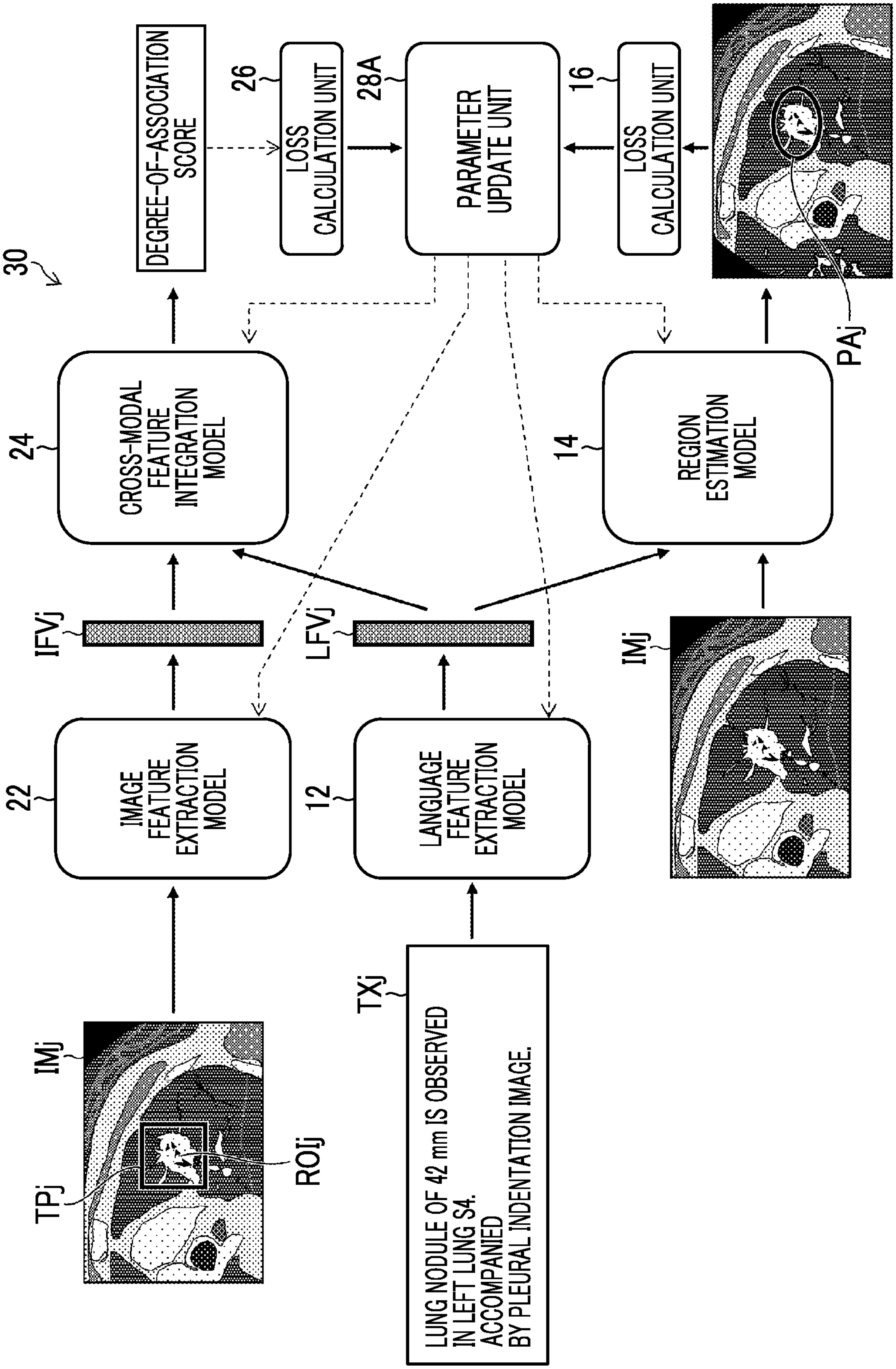
FIG. 7 is a block diagram schematically showing a functional configuration of a machine learning device according to a third embodiment.

FIG. 7 is a block diagram schematically showing a functional configuration of a machine learning device 30 according to a third embodiment. In the configuration shown in FIG. 7, the same reference numerals are assigned to elements having the same as or similar to the elements in the configurations shown in FIGS. 2 and 5, and redundant description thereof will be omitted.

The machine learning device 30 includes the language feature extraction model 12, the region estimation model 14, the image feature extraction model 22, the cross-modal feature integration model 24, the loss calculation units 16 and 26, and a parameter update unit 28A. The cross-modal feature integration model 24 is an example of a "third model" in the present disclosure, and the image feature extraction model 22 is an example of a "fourth model" in the present disclosure. The image feature IFVj output by the image feature extraction model 22 is an example of a "second feature amount" in the present disclosure.

The parameter update unit 28A calculates, based on a third loss obtained by integrating a first loss calculated by the loss calculation unit 16 and a second loss calculated by the loss calculation unit 26, the parameter update amount of each model of the language feature extraction model 12, the region estimation model 14, the image feature extraction model 22, and the cross-modal feature integration model 24, and updates the parameter of each model. A method of integrating the first loss and the second loss may be, for example, a sum, average, or weighted average of the first loss and the second loss.

That is, all the models are caused to learn such that the respective outputs of the degree-of-association score estimated by the cross-modal feature integration model 24 and the lesion region (region of interest) estimated by the region estimation model 14 are correct (close to correct answer).

The degree-of-association score output from the cross-modal feature integration model 24 is an example of "estimated degree of association" in the present disclosure. Although the loss calculation unit 16 and the loss calculation unit 26 are shown separately in FIG. 7, the loss calculation units 16 and 26 may be a common calculation unit and may comprise a calculation function of calculating the third loss by integrating the first loss calculated by the loss calculation unit 16 with respect to the output of the region estimation model 14 and the second loss calculated by the loss calculation unit 26 with respect to the output of the cross-modal feature integration model 24.

With employment of such a machine learning method to cause the four models to learn at the same time, each of the first loss calculated from the output of the region estimation model 14 and the second loss calculated from the output of the cross-modal feature integration model 24 is fed back to the learning of the language feature extraction model 12 and the image feature extraction model 22, and thus the performance of each model is improved.

According to the third embodiment, the feature related to the position of the region of interest in the image is embedded in the finding feature output from the language feature extraction model 12. Therefore, with training of the cross-modal feature integration model 24 using the finding feature, the finding sentence can be correctly associated with the region of interest (the lesion region) in the image described by the finding sentence.

Further, the configuration shown in FIG. 7 can also be applied to a case where the language feature extraction model 12E that has been learned according to the first embodiment is fine-tuned.

FIG. 8 is a block diagram showing an example of a hardware configuration of the machine learning device 30 according to the third embodiment. In the configuration shown in FIG. 8, points different from FIG. 3 will be described. The hardware configuration of the machine learning device 30 may be the same as the example shown in FIG. 3, and the learning processing program 230, which includes a learning processing program 230 instead of the learning processing program 130 of the FIG. 3, includes a command to acquire the data set for training and execute the learning processing for all models of the language feature extraction model 12, the region estimation model 14, the image feature extraction model 22, and the cross-modal feature integration model 24. The learning processing program 230 includes a data acquisition program 232, the language feature extraction model 12, the region estimation model 14, the image feature extraction model 22, the cross-modal feature integration model 24, a loss calculation program 236, and an optimizer 238.

The data acquisition program 232 includes a command to execute the processing of acquiring the data set for training from the training data storage unit 600. The loss calculation program 236 includes a command to execute the processing of calculating the first loss indicating the error between the estimated region information output from the region estimation model 14 and position information TPj of a correct answer, the processing of calculating the second loss indicating the error between the degree-of-association score output from the cross-modal feature integration model 24 and the correct-answer degree-of-association score, and the processing of calculating the third loss by integrating the first loss and the second loss. The optimizer 238 includes a command to execute the processing of calculating, from the calculated third loss, the update amount of the parameter of each model of the region estimation model 14 and the language feature extraction model 12, and of updating the parameter of each model. Other configurations thereof may be the same as the configurations of the machine learning device 10 shown in FIG. 3.

[Outline of Machine Learning Method]

FIG. 9 is a flowchart showing an example of a machine learning method executed by the machine learning device 30 according to the third embodiment. In the flowchart shown in FIG. 9, the same step numbers are assigned to steps common to the steps of the flowcharts shown in FIGS. 4 and 6, and redundant description will be omitted.

The flowchart shown in FIG. 9 includes steps S112 and S114 between step S110 and step S120 of the flowchart shown in FIG. 4.

Further, step S128 is included between steps S120 and S130 in FIG. 4, and steps S144 and S154 are included instead of steps S140 and S150 in FIG. 4.

In step S144, the processor 102 calculates, based on the loss obtained by integrating the loss calculated in step S128 and the loss calculated in step S130, the parameter update amount of each model of the image feature extraction model 22, the cross-modal feature integration model 24, the language feature extraction model 12, and the region estimation model 14 such that the loss becomes small.

In step S154, the processor 102 updates the parameter of each model according to the calculated parameter update amount. Other steps may be the same as the steps in FIG. 4.

Modification Example of Third Embodiment

As a modification example of the third embodiment, for example, a configuration can be employed in which a learned model is applied for the image feature extraction model 22 to exclude the image feature extraction model 22 from the learning target and the parameter update by the learning is performed for the three models of the language feature extraction model 12, the region estimation model 14, and the cross-modal feature integration model 24.

Fourth Embodiment: Example of Converting Structured Text into Feature Vector

In the first to third embodiments described above, an example has been described in which a text of the finding sentence in a sentence format is used as the input to the language feature extraction models 12 and 12E. However, the input to the language feature extraction models 12 and 12E is not limited to the text in the sentence format and may be a structured text obtained by structure analysis of the sentence. The structured text may be, for example, structured data in comma separated value (CSV) format.

In the dataset for training, the structured text (structurization findings) may be prepared instead of the finding sentence TXj or in addition to the finding sentence TXj, or the finding sentence may be subjected to the structure analysis as preprocessing of the input to the language feature extraction models 12 and 12E and may be converted into the structured data.

Figure 10:
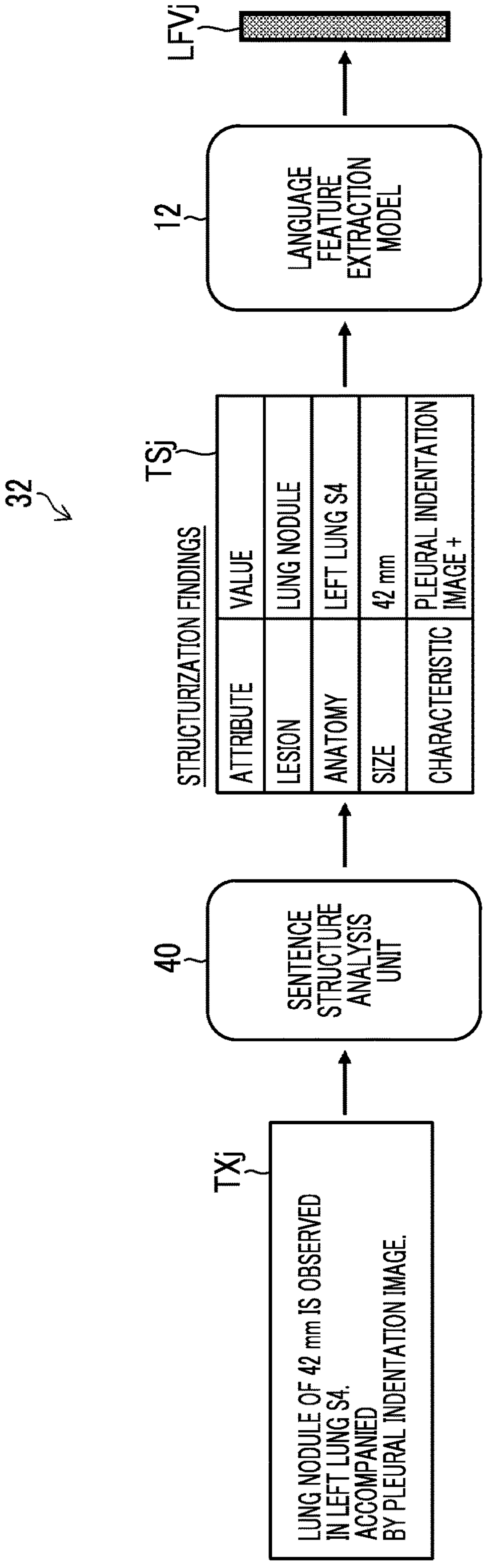
FIG. 10 is a block diagram showing a part of a functional configuration of a machine learning device according to a fourth embodiment.

FIG. 10 is a block diagram showing a part of a functional configuration of a machine learning device 32 according to a fourth embodiment. The machine learning device 32 comprises a sentence structure analysis unit 40 as a processing unit that performs the preprocessing of the input to the language feature extraction model 12. The sentence structure analysis unit 40 receives an input of the finding sentence TXj in the sentence format and performs the structure analysis of the finding sentence TXj to generate structured data TSj in which the finding sentence TXj is structured. Although not shown in FIG. 10, other configurations of the machine learning device 32 may be the same as those of the machine learning device 10, the machine learning device 20, or the machine learning device 30. A sentence structure analysis program is stored in the computer-readable medium 104 of the machine learning device 32.

[Example of Machine Learning Method]

Figure 11:
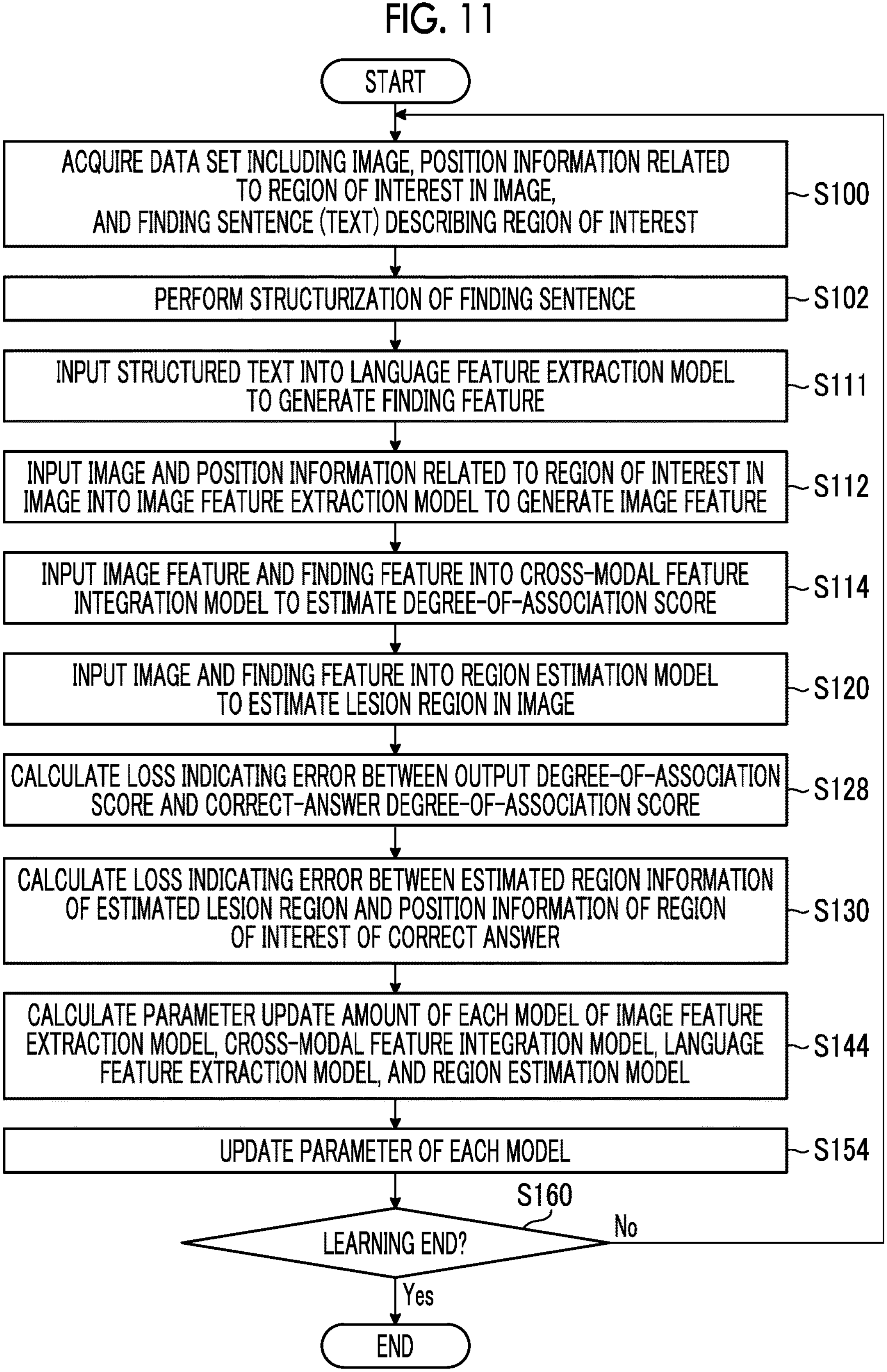
FIG. 11 is a flowchart showing an example of a machine learning method executed by the machine learning device according to the fourth embodiment.

FIG. 11 is a flowchart showing an example of a machine learning method executed by the machine learning device 32. Here, an example of the machine learning method using the machine learning device 32 in which the configuration of FIG. 10 is added to the configuration of the machine learning device 30 described with reference to FIGS. 7 and 8 will be described. In the flowchart shown in FIG. 11, the same step numbers are assigned to steps common to the flowchart shown in FIG. 9, and redundant description will be omitted.

The flowchart shown in FIG. 11 includes steps S102 and S111 instead of step S110 of FIG. 9.

After step S100, in step S102, the processor 102 performs the structure analysis on the finding sentence TXj in the sentence format to perform the structurization of the finding sentence TXj.

Thereafter, in step S111, the processor 102 inputs the structured text (structurization findings) into the language feature extraction model 12 to generate the finding feature LFVj. Subsequent processing may be the same as the flowchart shown in FIG. 9.

Modification Example of Fourth Embodiment

In the dataset for training, in a case where the structured data TSj corresponding to the finding sentence TXj is prepared in advance, the structurization findings (structured data TSj) may be acquired instead of the acquisition of the finding sentence TXj in step S100 of the flowchart shown in FIG. 9.

Fifth Embodiment: Use Example 2 of Learned Language Feature Extraction Model

In a fifth embodiment, an information processing apparatus 50 using the language feature extraction model 12, the image feature extraction model 22, and the cross-modal feature integration model 24 learned by the method of the third embodiment to which the configuration of the fourth embodiment is applied will be described as an example.

Figure 12:
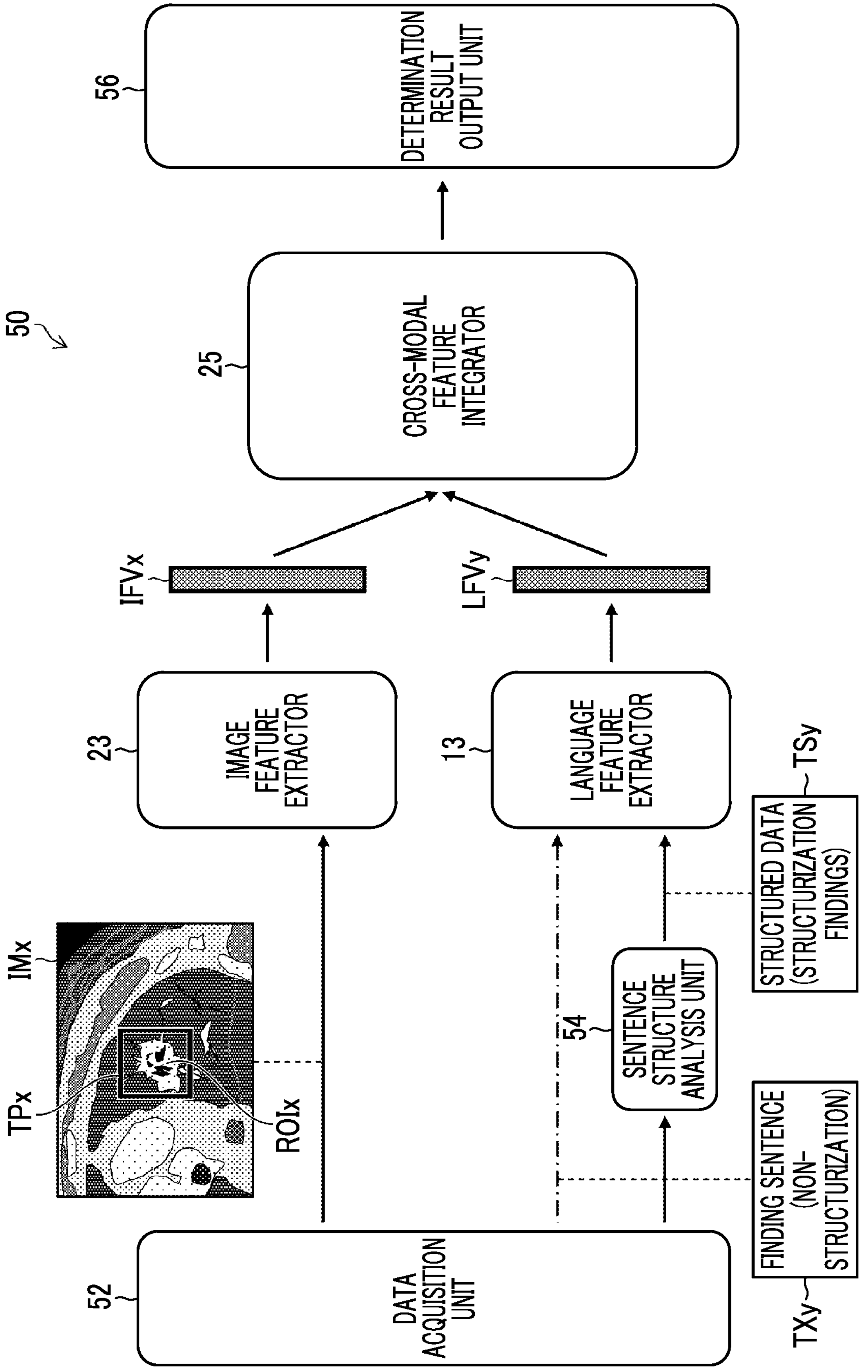
FIG. 12 is a block diagram schematically showing a functional configuration of an information processing apparatus according to a fifth embodiment.

FIG. 12 is a block diagram schematically showing a functional configuration of the information processing apparatus 50 according to the fifth embodiment. The information processing apparatus 50 includes a data acquisition unit 52, a sentence structure analysis unit 54, a language feature extractor 13, an image feature extractor 23, a cross-modal feature integrator 25, and a determination result output unit 56. Functions of each unit of the information processing apparatus 50 can be realized by a combination of hardware and software of a computer. The information processing apparatus 50 may be configured by a computer system including one or a plurality of computers. A form of the information processing apparatus 50 is not particularly limited and may be a server, a workstation, a personal computer, a tablet terminal, or the like. The information processing apparatus 50 may be, for example, a viewer terminal used for image interpretation.

The data acquisition unit 52 acquires an image IMx to be processed, position information TPx related to a region of interest ROIx in the image IMx, and a finding sentence TXy not associated with the image IMx. These pieces of data may be fetched from a data server (not shown) or the like. The image IMx is an example of a "second image" in the present disclosure, and the position information TPx is an example of "second position information" in the present disclosure. The finding sentence TXy is an example of a "text" in the present disclosure.

The image feature extractor 23 is a processing unit to which the learned image feature extraction model 22 is applied. The image IMx and the position information TPx related to the region of interest ROIx in the image IMx are input to the image feature extractor 23. The image feature extractor 23 receives the inputs of the image IMx and the position information TPx related to the region of interest ROIx, and outputs an image feature IFVx. The image feature IFVx is an example of an "image feature amount" in the present disclosure.

On the other hand, the finding sentence TXy acquired via the data acquisition unit 52 is input to the sentence structure analysis unit 54 and converted into structured data TSy. The sentence structure analysis unit 54 may be the same processing unit as the sentence structure analysis unit 40 described with reference to FIG. 10. The sentence structure analysis unit 54 performs the structure analysis of the finding sentence TXy to output the structured data TSy which is a structured text (structurization findings).

The language feature extractor 13 is a processing unit to which the learned language feature extraction model 12 is applied. The structured data TSy corresponding to the finding sentence TXy is input to the language feature extractor 13. The language feature extractor 13 receives the input of the structured data TSy and outputs a finding feature LFVy. The finding feature LFVy is an example of a "language feature amount" in the present disclosure.

The finding feature LFVy and the image feature IFVx generated in this manner are input to the cross-modal feature integrator 25. The cross-modal feature integrator 25 is a processing unit to which the learned cross-modal feature integration model 24 is applied. The cross-modal feature integrator 25 receives the inputs of the finding feature LFVy and the image feature IFVx, and determines relevance between the region of interest ROIx in the image IMx and the finding sentence TXy. The cross-modal feature integrator 25 determines whether or not there is relevance and may output a determination result of "relevant" or "irrelevant", or an evaluation value (degree-of-association score) indicating a degree of relevance.

The determination result output unit 56 performs the processing of outputting the determination result by the cross-modal feature integrator 25. For example, the determination result output unit 56 may be configured to perform at least one piece of processing of processing of displaying the determination result, processing of recording the determination result in a database or the like, processing of printing the determination result, or processing of transmitting the determination result to an external device.

Figure 13:
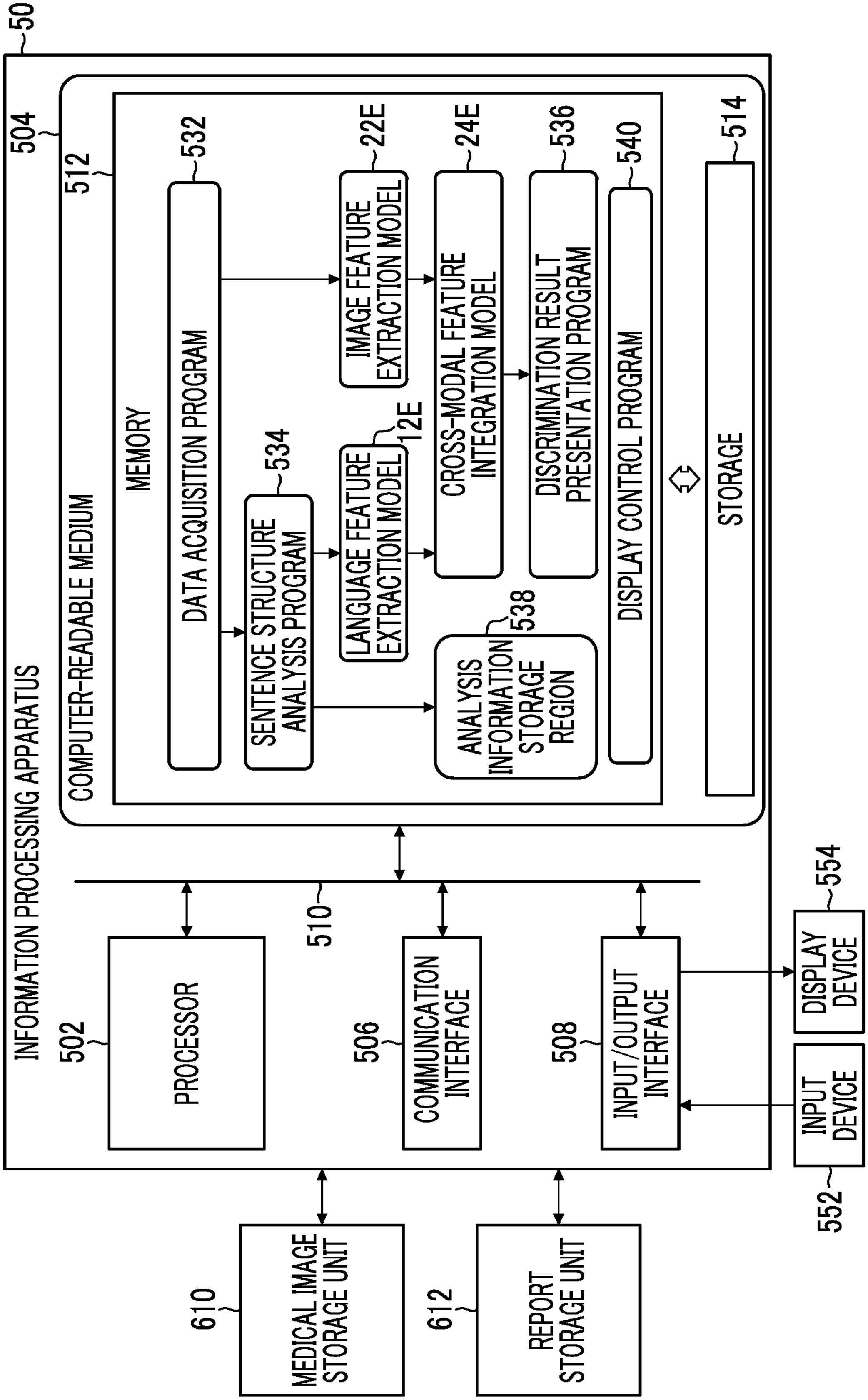
FIG. 13 is a block diagram schematically showing an example of a hardware configuration of the information processing apparatus according to the fifth embodiment.

FIG. 13 is a block diagram schematically showing an example of a hardware configuration of the information processing apparatus 50. The information processing apparatus 50 comprises a processor 502, a computer-readable medium 504, a communication interface 506, an input/output interface 508, and a bus 510. The computer-readable medium 504 includes a memory 512 and a storage 514. Further, the information processing apparatus 50 includes an input device 552 and a display device 554. These elements in the information processing apparatus 50 may have the same configuration as the corresponding elements of the machine learning device 10 described with reference to FIG. 3.

The computer-readable medium 504 stores various programs, data, and the like including a data acquisition program 532, a sentence structure analysis program 534, the language feature extraction model 12E, an image feature extraction model 22E, a cross-modal feature integration model 24E, and a discrimination result presentation program 536, and a display control program 540.

The data acquisition program 532 includes a command to execute the processing of acquiring data to be processed. The sentence structure analysis program 534 includes a command to execute the processing of performing the structure analysis of the input sentence and generating structured text data (structured data).

The language feature extraction model 12E, the image feature extraction model 22E, and the cross-modal feature integration model 24E each are learned models obtained by causing the language feature extraction model 12, the image feature extraction model 22, and the cross-modal feature integration model 24 to learn, by the method described in the third embodiment and the fourth embodiment.

The discrimination result presentation program 536 includes a command to execute output processing of presenting the determination result output from the cross-modal feature integration model 24E.

Further, the computer-readable medium 504 includes an analysis information storage region 538 that stores analysis information including the structured data that is an analysis result of the sentence structure analysis program 534. The structured text data may be stored in association with the finding sentence in the sentence format.

The information processing apparatus 50 may be connected to a medical image storage unit 610 and a report storage unit 612 via the communication interface 506. The medical image storage unit 610 may be, for example, a storage in a medical image management system represented by picture archiving and communication systems (PACS). The medical image storage unit 610 may be a DICOM server that stores medical images in accordance with a DICOM standard.

The report storage unit 612 may be a report storage server that stores and manages the image-interpretation report including the finding sentence created by a doctor in the medical image diagnosis. Alternatively, a medical data storage server that also has functions as the medical image storage unit 610 and the report storage unit 612 may be employed.

With the information processing apparatus 50, it is possible to discriminate the relevance between a finding sentence not associated with an image and the image and to associate the image and finding sentence that are discriminated to be relevant with each other. A method of the processing executed by the information processing apparatus 50 is an example of an "information processing method" in the present disclosure.

Modification Example 1 of Fifth Embodiment

Although an example in which the language feature extractor 13 receives the input of the structurization findings has been described in FIG. 12, the present disclosure is not limited thereto. The language feature extractor 13 may be configured to receive the input of the finding sentence in the sentence format. In this case, the sentence structure analysis unit 54 in FIG. 12 may be deleted.

Modification Example 2 of Fifth Embodiment

An example has been described in which the region estimation model 14 described with reference to FIG. 7 or the like is used as auxiliary means for performing the learning of the language feature extraction model 12, the region estimation model 14 is separated after the learning, and the learned language feature extraction model 12 is used. The learned region estimation model 14 may be combined with the learned language feature extraction model 12, as in the case of learning, to be used as lesion region estimation AI. The lesion region estimation AI can receive inputs of an image and a finding sentence related to the image and output an estimation result of a lesion region in the image referred to in the finding sentence.

Sixth Embodiment: Use Example 3 of Learned Language Feature Extraction Model

Figure 14:
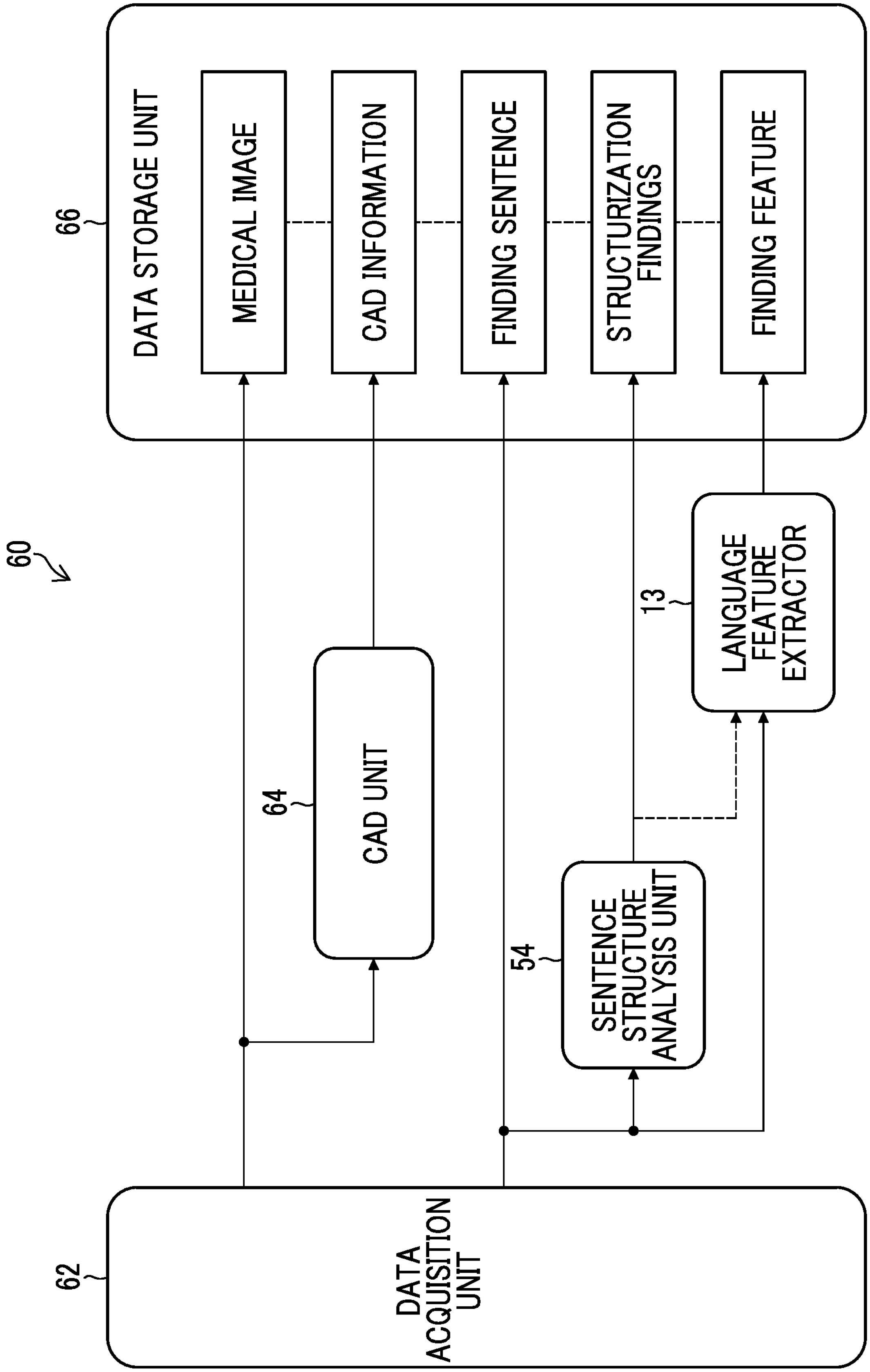
FIG. 14 is a block diagram schematically showing a functional configuration of an information processing apparatus according to a sixth embodiment.

FIG. 14 is a block diagram schematically showing a functional configuration of an information processing apparatus 60 according to a sixth embodiment. In a case where the image-interpretation report is created, the information processing apparatus 60 is an apparatus capable of performing processing of performing the structure analysis and feature vectorization of the finding sentence described in the report and storing the finding sentence in the sentence format, the structured structurization findings, and the feature-vectorized finding feature in an associated manner.

The information processing apparatus 60 includes a data acquisition unit 62, the sentence structure analysis unit 54, the language feature extractor 13, a computer aided diagnosis (CAD) unit 64, and a data storage unit 66. Functions of each unit of the information processing apparatus 60 can be realized by a combination of hardware and software of a computer. The information processing apparatus 60 may be configured by a computer system including one or a plurality of computers.

The data acquisition unit 62 receives inputs of the medical image to be image-interpreted and the finding sentence. The data acquisition unit 62 may automatically acquire target data from the medical image storage unit 610 or the report storage unit 612, or may receive the target data based on an instruction from the input device.

The CAD unit 64 performs image processing on the input medical image to generate CAD information that supports image diagnosis. The CAD unit 64 is configured by including, for example, an organ recognition program and/or a disease detection program. The organ recognition program includes a processing module that performs organ segmentation. The organ recognition program may include a lung section labeling program, a blood vessel region extraction program, a bone labeling program, and the like.

The disease detection program includes a detection processing module corresponding to a specific disease. As the disease detection program, for example, at least one program of a lung nodule detection program, a lung nodule characteristic analysis program, a pneumonia CAD program, a mammary gland CAD program, a liver CAD program, a brain CAD program, or a colon CAD program may be included.

These programs for CAD may be AI processing modules including a learned model that is learned to obtain an output of a target task by applying machine learning such as deep learning.

The CAD information output from the CAD unit 64 may include, for example, information indicating a position of a lesion region or the like in an image, information indicating classification such as a disease name, or a combination thereof.

The sentence structure analysis unit 54 performs the structure analysis of the finding sentence acquired via the data acquisition unit 52 to generate the structurization findings.

The language feature extractor 13 receives an input of the finding sentence acquired via the data acquisition unit 52 or the structurization findings structured by the sentence structure analysis unit 54, and generates the finding feature.

The information processing apparatus 60 performs processing of associating the medical image, the CAD information, the finding sentence, the structurization findings, and the finding feature with each other and of storing them in the data storage unit 66. The information processing apparatus 60 may construct a database in which a large number of such data sets are accumulated in the data storage unit 66.

Seventh Embodiment: Use Example for Processing of Searching for Similar Finding Sentence The finding feature generated by the language feature extraction model 12E can also be used for comparison between finding sentences. In a seventh embodiment, an example of providing a system that discriminates, using the finding feature extracted from each of a plurality of finding sentences, whether close contents (contents with high relevance) are described in the finding sentences or contents with low relevance (irrelevant) are described therein and searches for a candidate of a similar finding sentence (related finding sentence) from the database will be shown.

Figure 15:
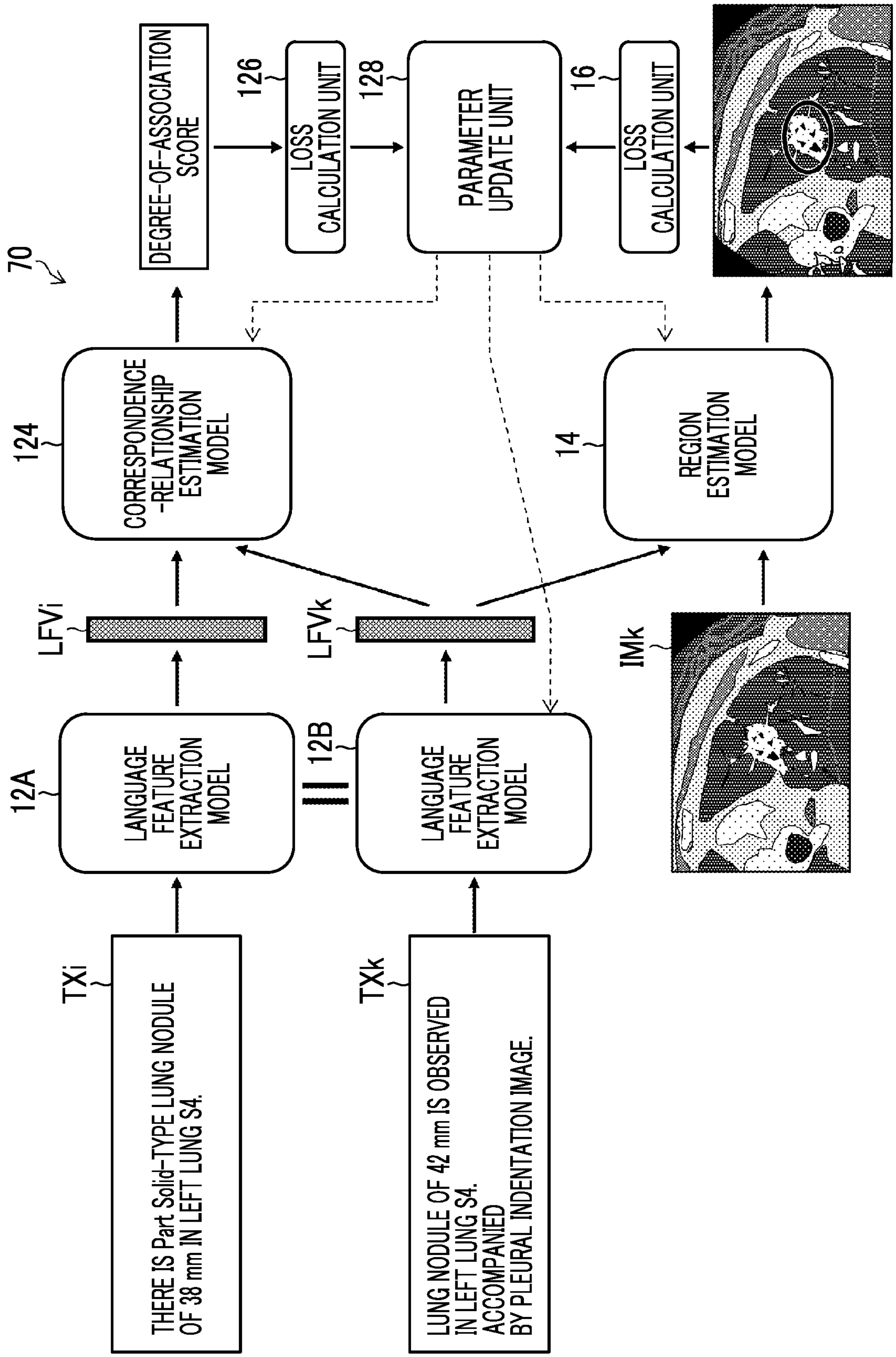
FIG. 15 is a block diagram schematically showing a functional configuration of a machine learning device according to a seventh embodiment.

FIG. 15 is a block diagram schematically showing a functional configuration of a machine learning device 70 according to the seventh embodiment. In the configuration shown in FIG. 15, the same reference numerals are assigned to elements having the same as or similar to the elements in the configurations shown in FIGS. 2 and 7, and redundant description thereof will be omitted.

The machine learning device 70 includes language feature extraction models 12A and 12B, the region estimation model 14, a correspondence-relationship estimation model 124, loss calculation units 16 and 126, and a parameter update unit 128. In FIG. 15, for convenience of explanation, the two language feature extraction models 12A and 12B are shown, but these are the same (common) language feature extraction models 12.

The machine learning device 70 receives inputs of a plurality of finding sentences TXi and TXk, inputs the received finding sentences TXi and TXk into the language feature extraction models 12A and 12B, respectively, and generates finding features LFVi and LFVk corresponding to the respective finding sentences TXi and TXk. The finding sentences TXi and TXk are examples of a "first text" and a "second text" in the present disclosure. The finding features LFVi and LFVk are examples of a "first feature amount" and a "third feature amount" in the present disclosure.

The correspondence-relationship estimation model 124 receives an input of a combination of the plurality of finding features LFVi and LFVk, estimates the correspondence relationship between the two finding features, and outputs the degree-of-association score indicating the degree of relevance. The degree-of-association score may be defined as, for example, a value such as "1" in a case where there is a correspondence relationship (relevance) between the finding sentences and "0" in a case where there is no correspondence relationship, and may be configured to take a value in a range of 1 to 0 depending on the degree of relevance. The correspondence-relationship estimation model 124 is an example of a "fifth model" in the present disclosure.

A loss calculation unit 126 calculates a loss (fourth loss) indicating an error between the degree-of-association score output by the correspondence-relationship estimation model 124 and the degree-of-association score of the correct answer. The degree-of-association score of the correct answer is provided as correct answer data after a degree of association is evaluated in advance for a combination of the plurality of finding sentences TXi and TXk used for input. In the case of the two finding sentences TXi and TXk illustrated in FIG. 15, both describe the contents related to similar lesions, and the finding sentences have high degree of association.

The configurations of the language feature extraction model 12B and the region estimation model 14, the configuration of the loss calculation unit 16, and the operation of each unit of the above may be the same as the examples described with reference to FIG. 7.

The parameter update unit 128 calculates, based on a fifth loss obtained by integrating the first loss obtained from the loss calculation unit 16 and the fourth loss obtained from the loss calculation unit 126, the parameter update amount of each model of the correspondence-relationship estimation model 124, the language feature extraction model 12, and the region estimation model 14, and updates the parameter of each model. That is, all the models are caused to learn such that the respective outputs of the degree-of-association score estimated by the correspondence-relationship estimation model 124 and the lesion region (region of interest) estimated by the region estimation model 14 are correct (close to correct answer).

Although the loss calculation unit 16 and the loss calculation unit 126 are shown separately in FIG. 15, the loss calculation units 16 and 126 may be a common calculation unit and may comprise a calculation function of calculating the fifth loss by integrating the first loss calculated by the loss calculation unit 16 with respect to the output of the region estimation model 14 and the fourth loss calculated by the loss calculation unit 126 with respect to the output of the correspondence-relationship estimation model 124.

Figure 16:
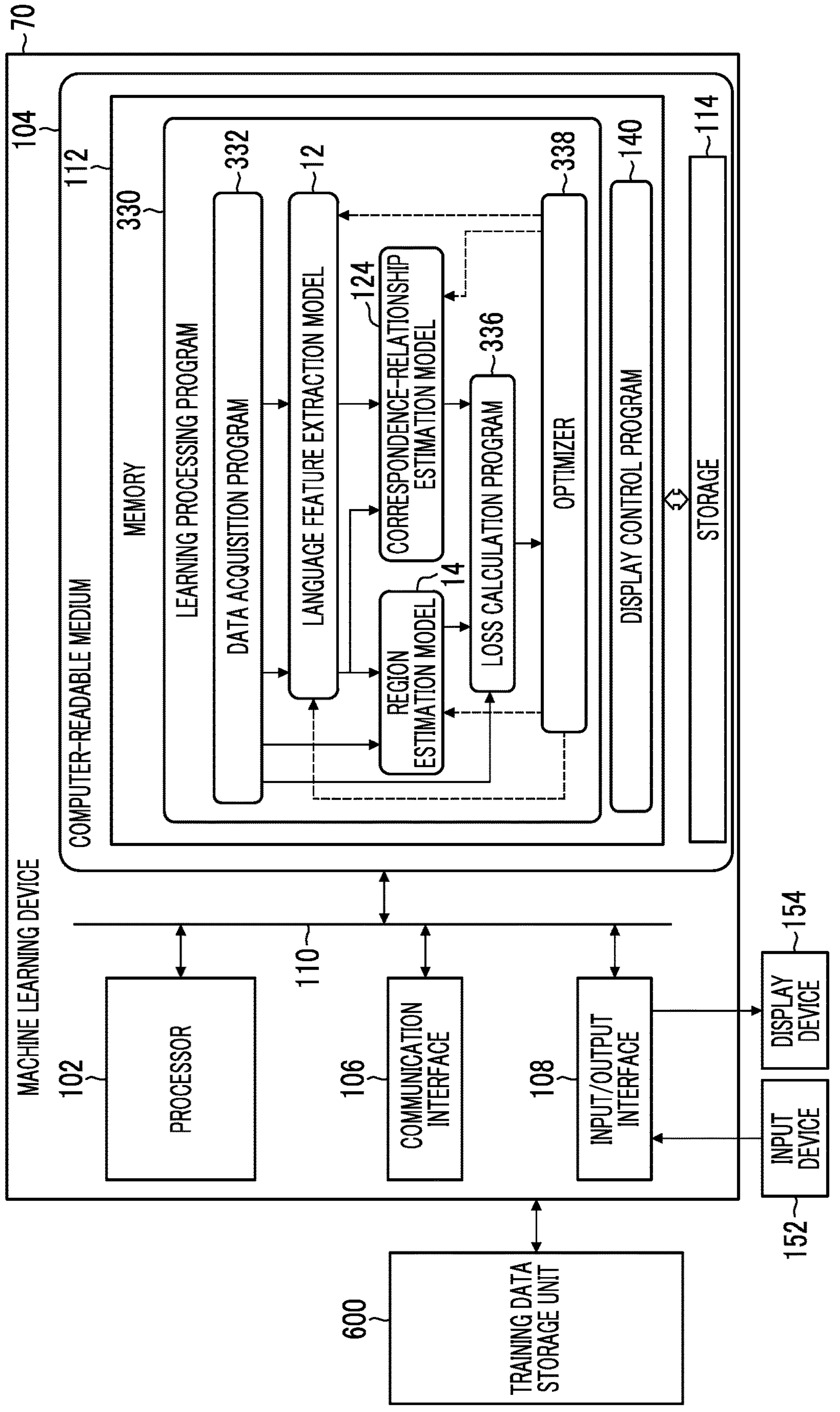
FIG. 16 is a block diagram schematically showing an example of a hardware configuration of the machine learning device according to the seventh embodiment.

FIG. 16 is a block diagram schematically showing an example of a hardware configuration of the machine learning device 70. The hardware configuration of the machine learning device 70 may be the same as the hardware configuration shown in FIG. 8. In the configuration shown in FIG. 16, the same reference numerals are assigned to elements common to the elements in the configuration shown in FIG. 8, and redundant description thereof will be omitted. In the configuration shown in FIG. 16, points different from FIG. 8 will be described.

A learning processing program 330 is stored in the computer-readable medium 104 of the machine learning device 70 instead of the learning processing program 230. The learning processing program 330 includes a data acquisition program 332, the language feature extraction model 12, the region estimation model 14, the correspondence-relationship estimation model 124, a loss calculation program 336, and an optimizer 338.

The data acquisition program 332 includes a command to execute the processing of acquiring, from the training data storage unit 600, a data set including a plurality of finding sentences and a corresponding image. The language feature extraction model 12 includes a command to execute the processing of receiving an input of a combination of the acquired plurality of finding sentences and generating the finding feature for each of the finding sentences. The loss calculation program 336 includes a command to execute the processing of calculating the fifth loss obtained by integrating the first loss calculated from the output of the region estimation model 14 and the fourth loss calculated from the output of the correspondence-relationship estimation model 124.

The optimizer 338 includes a command to execute the processing of calculating the parameter update amount of each of the three models of the language feature extraction model 12, the region estimation model 14, and the correspondence-relationship estimation model 124 from the calculated fifth loss, and of updating the parameter of each model. Other configurations may be the same as the configurations in FIG. 8.

Figure 17:
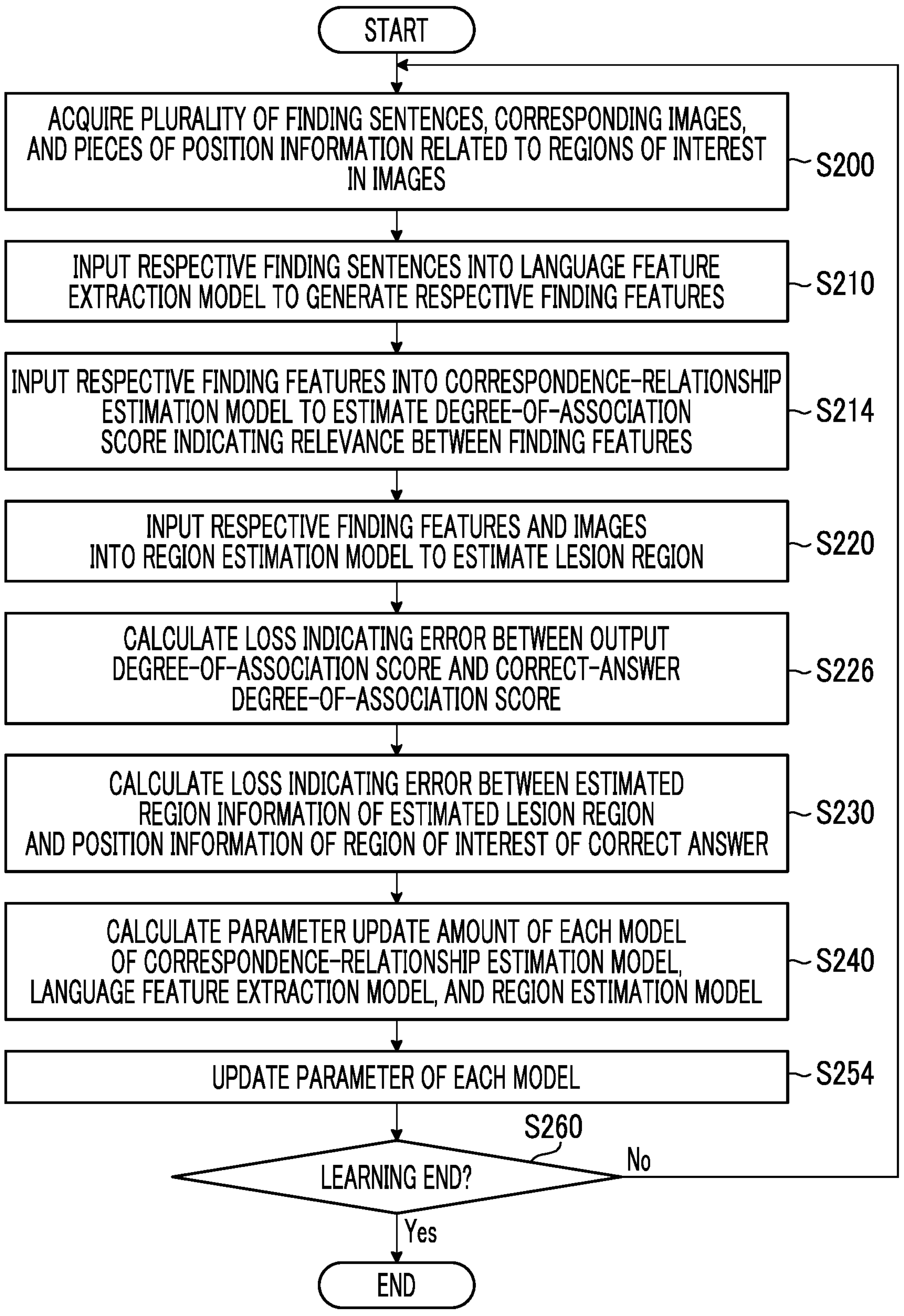
FIG. 17 is a flowchart showing an example of a machine learning method executed by the machine learning device according to the seventh embodiment.

FIG. 17 is a flowchart of a machine learning method executed by the machine learning device 70. In step S200, the processor 102 acquires a data set including the plurality of finding sentences TXi and TXk, corresponding images IMi and IMk, and the pieces of position information TPi and TPk related to regions of interest ROIi and ROIk in the images IMi and IMk (i k).

In step S210, the processor 102 inputs the respective finding sentences TXi and TXk into the language feature extraction model 12 to generate the finding features LFVi and LFVk of the respective finding sentences.

In step S214, the processor 102 inputs the respective finding features LFVi and LFVk into the correspondence-relationship estimation model 124 to estimate the degree-of-association score indicating the relevance between the two features.

In step S220, the processor 102 inputs a combination of the finding features TXi and TXk and the images IMi and IMk into the region estimation model 14 to estimate the lesion region.

In step S226, the processor 102 calculates a loss indicating an error between the degree-of-association score output from the correspondence-relationship estimation model 124 and the degree-of-association score of the correct answer.

In step S230, the processor 102 calculates a loss indicating an error between the position of the lesion region estimated by the region estimation model 14 and the position of the region of interest of the correct answer.

In step S240, the processor 102 calculates the parameter update amount of each model of the correspondence-relationship estimation model 124, the language feature extraction model 12, and the region estimation model 14 such that a loss obtained by integrating the loss calculated in step S226 and the loss calculated in step S230 becomes small.

In step S254, the processor 102 updates the parameter of each model according to the parameter update amount calculated in step S240. The operations of steps S200 to S254 may be performed in a mini-batch unit.

After step S254, in step S260, the processor 102 determines whether or not to end the learning. Step S260 may be the same processing as step S160 of FIG. 4.

In a case where No determination is made in a determination result in step S260, the processor 102 returns to step S200. In a case where Yes determination is made in the determination result in step S260, the processor 102 ends the flowchart of the figure.

Modification Example of Seventh Embodiment

Although an example in which the finding sentence in the sentence format is input to the language feature extraction model 12 has been described in FIGS. 15 and 16, the structured text (structurization findings) may be configured to be input to the language feature extraction model 12, as described in the fourth embodiment (FIG. 10).

Eighth Embodiment

In an eighth embodiment, an example of an information processing apparatus 300 that performs processing of discriminating the correspondence relationship of the finding sentences by using the learned language feature extraction model 12E generated by the method of the seventh embodiment will be described.

Figure 18:
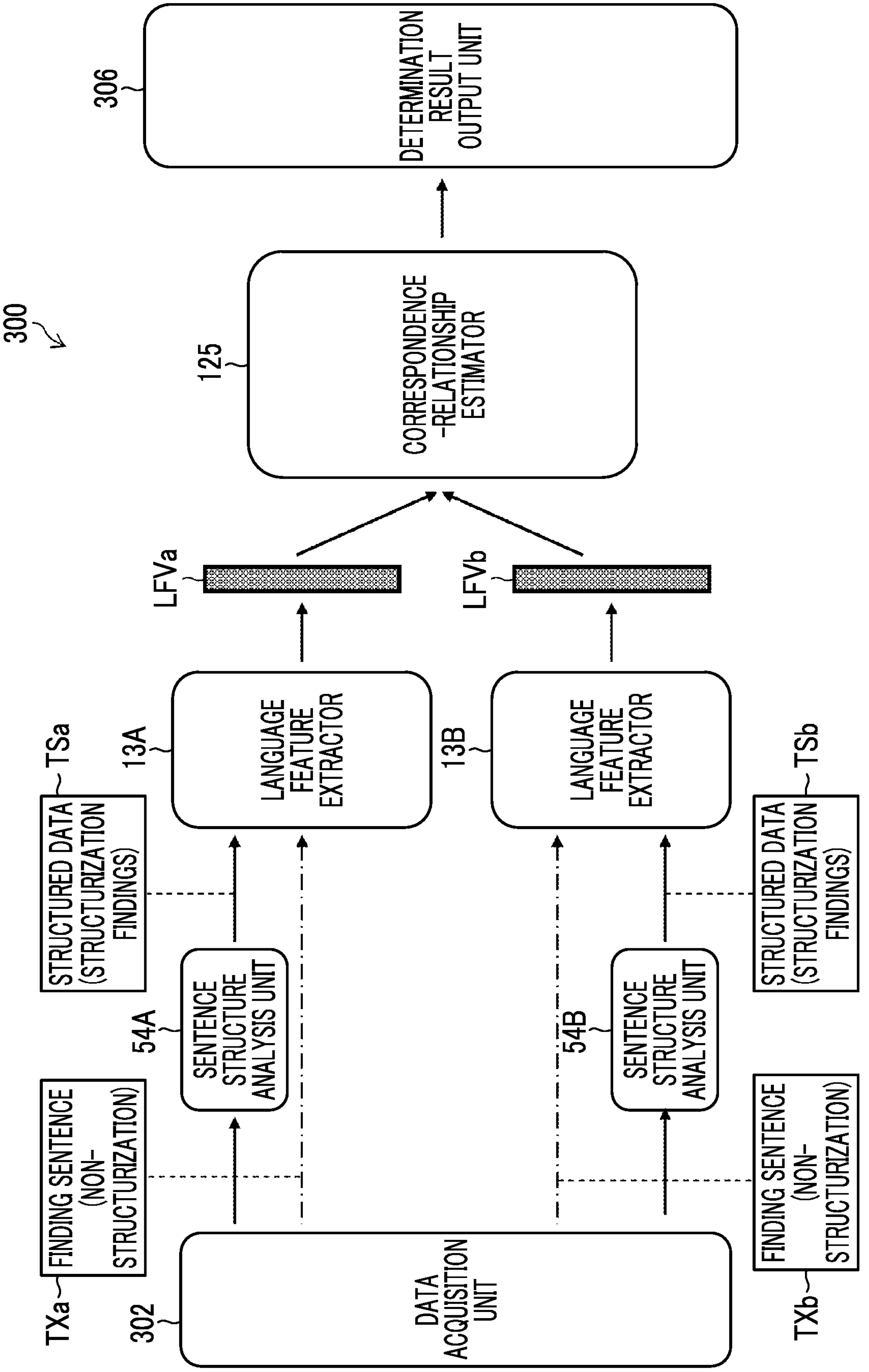
FIG. 18 is a block diagram schematically showing a functional configuration of an information processing apparatus according to an eighth embodiment.

FIG. 18 is a block diagram schematically showing a functional configuration of the information processing apparatus 300 according to the eighth embodiment. The information processing apparatus 300 includes a data acquisition unit 302, sentence structure analysis units 54A and 54B, language feature extractors 13A and 13B, a correspondence-relationship estimator 125, and a determination result output unit 306. Functions of each unit of the information processing apparatus 300 can be realized by a combination of hardware and software of a computer. The information processing apparatus 300 may be configured by a computer system including one or a plurality of computers.

The data acquisition unit 302 acquires a combination of a plurality of finding sentences TXa and TXb to be compared. The sentence structure analysis unit 54A performs the structure analysis of the finding sentence TXa to generate structured data TSa. Similarly, the sentence structure analysis unit 54B performs the structure analysis of the finding sentence TXb to generate structured data TSb. In FIG. 15, for convenience of explanation, the two sentence structure analysis units 54A and 54B are shown, but these are the same (common) sentence structure analysis units 54.

The language feature extractors 13A and 13B are processing units to which the learned model in which the language feature extraction model 12 is caused to learn by the machine learning method described in the sixth embodiment is applied. The two language feature extractors 13A and 13B shown in FIG. 15 are the same (common) language feature extractors.

The language feature extractor 13A receives the input of the structured data TSa and generates a corresponding finding feature LFVa. Similarly, the language feature extractor 13B receives the input of the structured data TSb and generates a corresponding finding feature LFVb.

The language feature extractors 13A and 13B may be configured to receive the inputs of the finding sentences TXa and TXb, instead of the structured data TSa and TSb, and generate the corresponding finding features LFVa and LFVb. In this case, the sentence structure analysis units 54A and 54B may be omitted.

The correspondence-relationship estimator 125 is a processing unit to which the learned model in which the correspondence-relationship estimation model 124 is caused to learn by the machine learning method according to the sixth embodiment is applied. The correspondence-relationship estimator 125 receives an input of a combination of the finding features LFVa and LFVb, and determines whether or not the two features have a corresponding relationship.

The determination result output unit 306 performs output processing of a discrimination result of the correspondence relationship output from the correspondence-relationship estimator 125. The determination result output unit 306 may output the discrimination result related to the presence or absence of the correspondence relationship between the two finding sentences, or generate a list of candidates for similar finding sentences using the discrimination result and output the similar finding-sentence candidate list.

Figure 19:
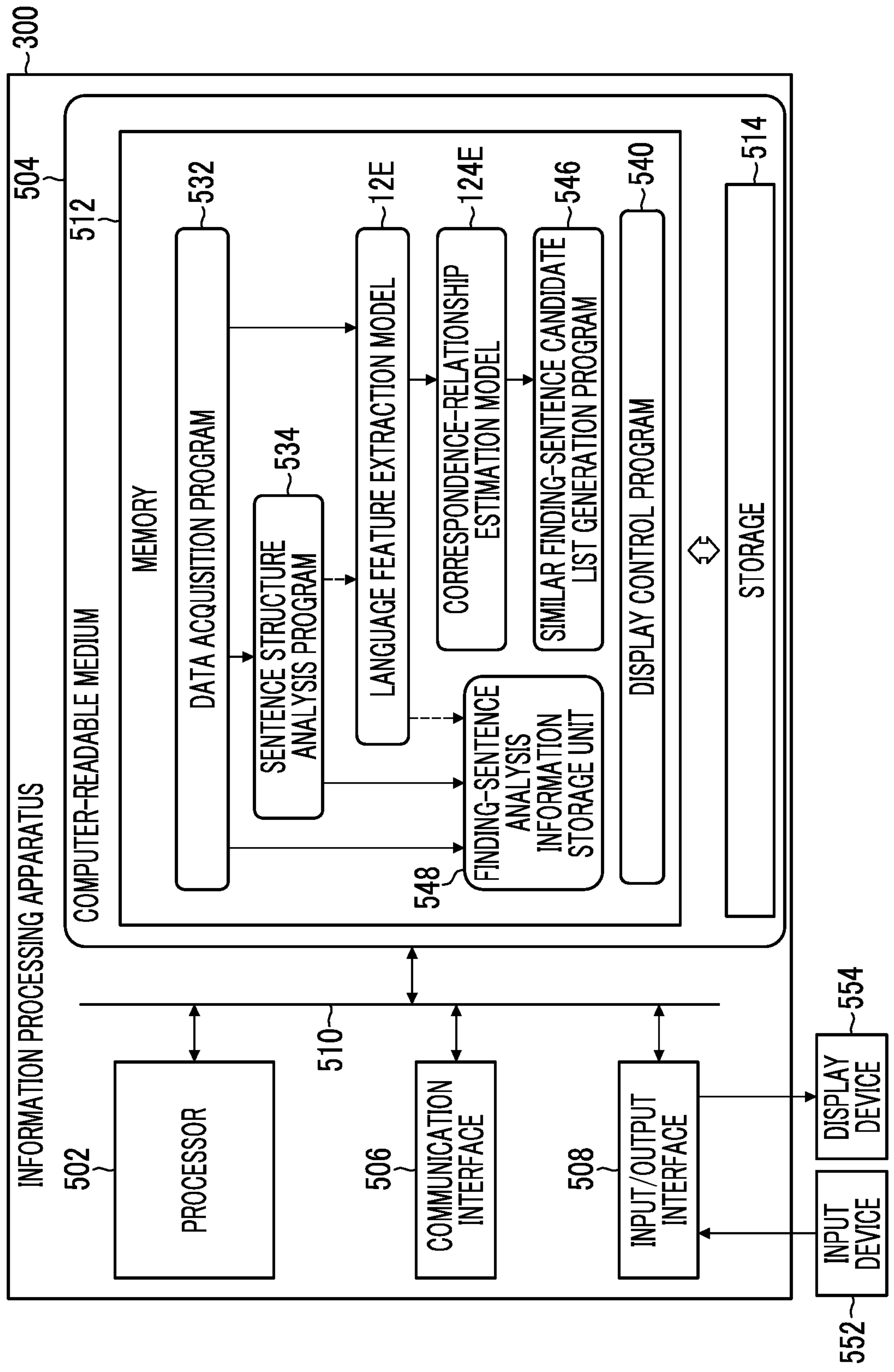
FIG. 19 is a block diagram showing an example of a hardware configuration of the information processing apparatus according to the eighth embodiment.

FIG. 19 is a block diagram showing an example of a hardware configuration of the information processing apparatus 300. The hardware configuration of the information processing apparatus 300 may be the same as the example shown in FIG. 13. In the configuration shown in FIG. 19, the same reference numerals are assigned to elements having the same as or similar to the elements in the configuration shown in FIG. 13, and redundant description thereof will be omitted.

A plurality of programs including the data acquisition program 532, the sentence structure analysis program 534, the language feature extraction model 12E, a correspondence-relationship estimation model 124E, and a similar finding-sentence candidate list generation program 546 are stored in the computer-readable medium 504 of the information processing apparatus 300. The data acquisition program 532 includes a command to execute the processing of acquiring the finding sentence to be processed. The data acquisition program 532 may acquire data from a database (not shown) in which past reports are stored, or may receive data input via the input device 552.

The similar finding-sentence candidate list generation program 546 includes a command to execute processing of searching for, based on the output of the correspondence-relationship estimation model 124E, similar finding sentences from a database (not shown) to generate the similar finding-sentence candidate list including extracted similar finding sentences.

Further, the computer-readable medium 504 of the information processing apparatus 300 includes a finding-sentence analysis information storage unit 548. The finding-sentence analysis information storage unit 548 stores the information of the analysis result including the structured data obtained by the sentence structure analysis program 534. Other configurations may be the same as the configurations in FIG. 13.

Ninth Embodiment

In a ninth embodiment, an example of an information processing apparatus 400 that performs a similarity search of the finding sentence by using the finding feature generated by using the learned language feature extraction model 12E will be described.

Figure 20:
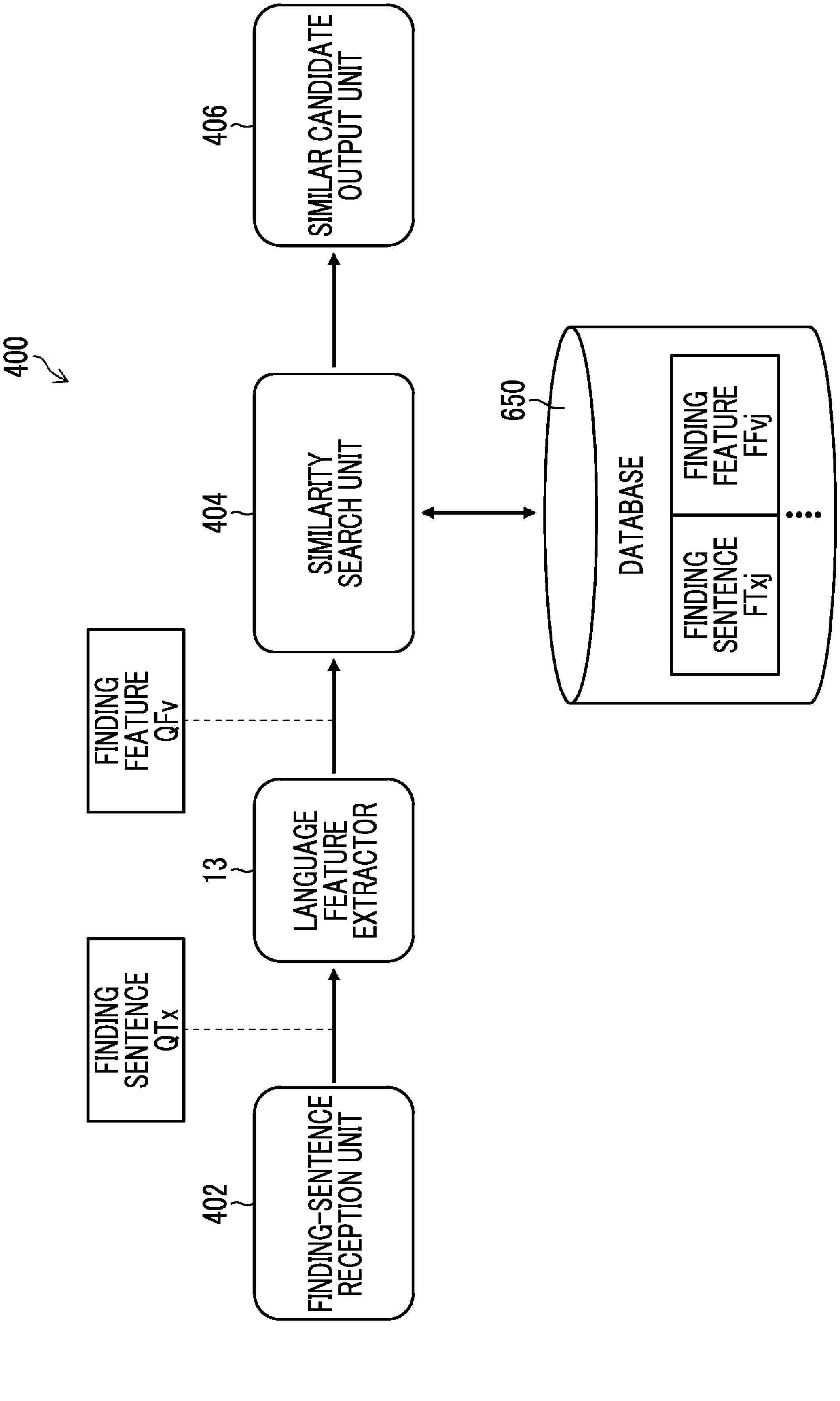
FIG. 20 is a block diagram schematically showing a functional configuration of an information processing apparatus according to a ninth embodiment.

FIG. 20 is a block diagram schematically showing a functional configuration of the information processing apparatus 400 according to the ninth embodiment. The information processing apparatus 400 comprises a finding-sentence reception unit 402, the language feature extractor 13, a similarity search unit 404, and a similar candidate output unit 406. The information processing apparatus 400 may comprise a database storage unit 650. The database storage unit 650 may be an external device communicably connected to the information processing apparatus 400.

Functions of each unit of the information processing apparatus 400 can be realized by a combination of hardware and software of a computer. The information processing apparatus 400 may be configured by a computer system including one or a plurality of computers.

The database storage unit 650 stores a database including a plurality of data sets in which a finding sentence FTXj is associated with a finding feature FFVj extracted from the finding sentence FTXj.

In the information processing apparatus 400 according to the ninth embodiment, a feature vector (finding feature FFVj) is calculated in advance using the language feature extractor 13 for each of a large number of finding sentences FTXj included in past reports, and the finding sentence FTXj and the finding feature FFVj are associated with each other and stored in the database.

The finding-sentence reception unit 402 receives a finding sentence QTx for which the similar finding sentence is to be searched as an input, and calculates a finding feature QFv by the language feature extractor 13. The similarity search unit 404 calculates a distance between vectors of the finding feature QFv and each finding feature FFVj calculated in advance to extract a plurality of candidates having a short distance as the similar finding-sentence candidates.

The similar candidate output unit 406 performs output processing of presenting the similar finding-sentence candidates extracted by the similarity search unit 404 to a user.

With such a configuration, the candidates for the finding sentence similar to the finding sentence QTx received from the finding-sentence reception unit 402 are extracted from the database and presented to the user as a candidate list.

<<Program for Operating Computer>>

A program causing the computer to realize a part or all of the processing functions in each device of the machine learning device 10, the machine learning device 20, the machine learning device 30, the machine learning device 32, the machine learning device 70, the information processing apparatus 50, the information processing apparatus 60, the information processing apparatus 300, and the information processing apparatus 400, which are described in each of the above-described embodiments, can be recorded in a computer-readable medium, which is a non-transitory information storage medium such as an optical disk, a magnetic disk, a semiconductor memory, or other tangible objects, and can be provided through the information storage medium.

Further, instead of the mode in which the program is provided by being stored in such a non-transitory tangible computer-readable medium, a program signal may be provided as a download service using an electric telecommunication line such as the Internet.

Furthermore, a part or all of the processing functions in each of the devices described above may be realized by cloud computing, or can be provided as software as a service (SaaS).

<<Hardware Configuration of Each Processing Unit>>

A hardware structure of the processing unit that executes various types of processing, such as the loss calculation units 16, 26, and 126, parameter update units 18, 28, 28A, and 128, sentence structure analysis unit 40 in the machine learning device 10 and the like, and the data acquisition units 52, 62, and 302, sentence structure analysis unit 54, language feature extractor 13, image feature extractor 23, cross-modal feature integrator 25, correspondence-relationship estimator 125, determination result output units 56 and 306, CAD unit 64, finding-sentence reception unit 402, similarity search unit 404, and similar candidate output unit 406 in the information processing apparatus 50 and the like, which are described in each of the above-described embodiments, is various processors as shown below, for example.

Various processors include a CPU, which is a general-purpose processor that executes a program and functions as various processing units, GPU, a programmable logic device (PLD), which is a processor whose circuit configuration is able to be changed after manufacturing such as a field programmable gate array (FPGA), a dedicated electric circuit, which is a processor having a circuit configuration specially designed to execute specific processing such as an application specific integrated circuit (ASIC), and the like.

One processing unit may be configured by one of these various processors or may be configured by two or more processors having the same type or different types. For example, one processing unit may be configured by a plurality of FPGAs, a combination of a CPU and an FPGA, or a combination of a CPU and a GPU. The plurality of processing units may be configured of one processor. As an example in which the plurality of processing units are configured by one processor, firstly, as represented by a computer such as a client and a server, a form may be employed in which one processor is configured by a combination of one or more CPUs and software and the processor functions as the plurality of processing units. Secondly, as represented by a system on chip (SoC) or the like, a form may be employed in which a processor that realizes the function of the entire system including the plurality of processing units by one integrated circuit (IC) chip is used. As described above, the various processing units are configured by using one or more various processors as the hardware structure.

Further, as the hardware structure of the various processors, more specifically, an electric circuit (circuitry) in which circuit elements such as semiconductor elements are combined may be used.

Advantages of Embodiments of Present Disclosure

According to each of the embodiments of the present disclosure described above, the following effects can be obtained.

[1] The language feature extraction model 12 is trained to output, from the input finding sentence or the structurization findings, the finding feature that is the feature vector including the feature of the position of the region of interest in the image that the finding sentence or the structurization findings refers to. The language feature extraction model 12E generated by the method described in the embodiment of the present disclosure can generate, from the input text, the feature vector in which the feature related to the position of the region of interest in the image is embedded. The feature vector generated by the language feature extraction model 12E can be used for various purposes, for example, processing of discriminating the degree of association between the image and the finding sentence or processing of searching for a similar finding sentence and presenting a candidate for a similar report.

[2] According to the method described with the embodiment of the present disclosure, in a case where the language feature extraction model 12 is trained, a correct-answer feature amount (correct-answer feature vector) that is correct answer data for the output of the language feature extraction model 12 is not required to be prepared and it is possible to cause the language feature extraction model 12 to learn, using a data set of the image IMj, the position information TPj of the region of interest ROIj in the image IMj, and the finding sentence or the text of the structurization findings describing the region of interest ROIj in the image IMj, a relationship between the text and the position of the region of interest in the image.

[3] According to the method described with the embodiment of the present disclosure, it is possible to generate the high-performance language feature extraction model 12E even in a case where the learning data is relatively small.

<<Type of Medical Image>>

In the technology of the present disclosure, in addition to the CT image, various medical images captured by various medical devices (modalities), such as an MR image captured by using a magnetic resonance imaging (MRI) apparatus, an ultrasound image that projects human body information, a PET image captured by using a positron emission tomography (PET) apparatus, and an endoscopic image captured by using an endoscopic apparatus, can be targeted. The image targeted by the technology of the present disclosure is not limited to the three-dimensional image, and may be a two-dimensional image.

<<Other Application Examples>>

In the above-described embodiment, the image and the finding sentence in the medical image diagnosis have been described as an example. However, the scope of application of the present disclosure is not limited to this example and can be applied to various images and a text related to a region of interest in the image regardless of purposes. For example, the technique of the present disclosure can also be applied to a combination of an image of a structure and a text related to a defective portion in the image and the like.

<<Other>>

The present disclosure is not limited to the above embodiment, and various modifications can be made without departing from the spirit of the technical idea of the present disclosure.

EXPLANATION OF REFERENCES

10: machine learning device
12, 12A, 12B, 12E: language feature extraction model
13, 13A, 13B: language feature extractor
14: region estimation model
16: loss calculation unit
18: parameter update unit
20: machine learning device
22, 22E: image feature extraction model
23: image feature extractor
24, 24E: cross-modal feature integration model
25: cross-modal feature integrator
26: loss calculation unit
28, 28A: parameter update unit
30, 32: machine learning device
40: sentence structure analysis unit
50: information processing apparatus
52: data acquisition unit
54, 54A, 54B: sentence structure analysis unit
56: determination result output unit
60: information processing apparatus
62: data acquisition unit
64: CAD unit
66: data storage unit
70: machine learning device

102: processor
104: computer-readable medium
106: communication interface
108: input/output interface
110: bus
112: memory
114: storage
124, 124E: correspondence-relationship estimation model
125: correspondence-relationship estimator
126: loss calculation unit
128: parameter update unit
130: learning processing program
132: data acquisition program
136: loss calculation program
138: optimizer
140: display control program
152: input device
154: display device
230: learning processing program
232: data acquisition program
236: loss calculation program
238: optimizer
300: information processing apparatus
302: data acquisition unit
304: computer-readable medium
306: determination result output unit
330: learning processing program
332: data acquisition program
336: loss calculation program
338: optimizer
400: information processing apparatus
402: finding-sentence reception unit
404: similarity search unit
406: similar candidate output unit
502: processor
504: computer-readable medium
506: communication interface
508: input/output interface
510: bus
512: memory
514: storage
532: data acquisition program
534: sentence structure analysis program
536: discrimination result presentation program
538: analysis information storage region
540: display control program
546: similar finding-sentence candidate list generation program
548: finding-sentence analysis information storage unit
552: input device
554: display device
600: training data storage unit
610: medical image storage unit
612: report storage unit
650: database storage unit
TDj: training data
IMi, IMj, IMk, IMx: image
ROIi, ROIj, ROIk, ROIx: region of interest
TXi, TXj, TXk, TXy, TXa, TXb: finding sentence
LFVj, LFVy, LFVa, LFVb: finding feature
IFVj, IFVx: image feature
TPi, TPj, TPk, TPx: position information
PAj: estimated region information
TSj, TSy, TSa, TSb: structured data
FTXj: finding sentence
FFVj: finding feature
QTx: finding sentence
QFv: finding feature
S100 to S160: steps of machine learning method
S200 to S260: steps of machine learning method

What is claimed is:

1. A method of generating a language feature extraction model that causes a computer to execute processing of extracting a feature from a text related to an image, the method comprising:

by a system including one or more processors, with performing of machine learning using a plurality of pieces of training data including a first image, first position information related to a region of interest in the first image, and a first text that describes the region of interest to input the first text into a first model to cause the first model to output a first feature amount representing a feature of the first text, input the first image and the first feature amount into a second model different from the first model to cause the second model to generate estimated region information specifying a location of the region of interest in the first image based on the first feature amount, and train the first model and the second model such that an estimated region of interest output from the second model matches the region of interest of a correct answer indicated by the first position information, generating the first model, which is the language feature extraction model.

2. The method of generating a language feature extraction model according to claim 1, comprising:

by the system, using a third model that receives inputs of an image feature amount extracted from the image and a language feature amount extracted from the text and outputs a degree of association between the two feature amounts;

in the machine learning, inputting of a second feature amount extracted from the first image and the first feature amount into the third model to cause the third model to estimate a degree of association between the first image and the first text; and training of the first model and the third model such that an estimated degree of association output from the third model matches a degree of association of the correct answer.

3. The method of generating a language feature extraction model according to claim 2, comprising by the system, using a fourth model that extracts the second feature amount from the input first image, in the machine learning, inputting of the first image and the first position information into the fourth model to cause the fourth model to output the second feature amount, and training of the first model, the third model, and the fourth model such that the estimated degree of association output from the third model matches the degree of association of the correct answer.

4. The method of generating a language feature extraction model according to claim 1, comprising by the system, using a fifth model that receives an input of a language feature amount extracted from each of a plurality of texts and outputs a degree of association between the plurality of the texts, in the machine learning, inputting of a third feature amount, which is extracted, by the first model, from a second text different from the first text by inputting the second text into the first model, and the first feature amount into the fifth model to cause the fifth model to estimate a degree of association between the first text and the second text, and training of the first model and the fifth model such that an estimated degree of association output from the fifth model matches a degree of association of a correct answer.

5. The method of generating a language feature extraction model according to claim 1, wherein the text and the first text are structured texts.

6. The method of generating a language feature extraction model according to claim 4, wherein the second text is a structured text.

7. The method of generating a language feature extraction model according to claim 1, comprising by the system, performing of processing of displaying the region of interest estimated by the second model.

8. The method of generating a language feature extraction model according to claim 1, wherein the first position information includes coordinate information that specifies a position of the region of interest in the first image.

9. The method of generating a language feature extraction model according to claim 1, wherein the first image is a cropped image including the first position information.

10. An information processing apparatus comprising:

one or more storage devices that store a program including the language feature extraction model generated by the method of generating a language feature extraction model according to claim 1; and one or more processors that execute the program.

11. An information processing apparatus comprising:

one or more processors; and one or more storage devices that store a command executed by the one or more processors, wherein the one or more processors are configured to:

acquire a text that describes a region of interest in an image; and execute processing of inputting the text into a first model to cause the first model to output a language feature amount representing a feature of the text, and the first model is a model obtained by performing machine learning using a plurality of pieces of training data including a first image for training, first position information related to a region of interest in the first image, and a first text that describes the region of interest to input the first text into the first model to cause the first model to output a first feature amount representing a feature of the first text and inputting of the first image and the first feature amount into a second model different from the first model to cause the second model to generate estimated region information specifying a location of the region of interest in the first image based on the first feature amount, and train the first model and the second model such that an estimated region of interest output from the second model matches the region of interest of a correct answer indicated by the first position information.

12. The information processing apparatus according to claim 10, wherein the one or more processors are configured to:

input an image feature amount extracted from a second image and a language feature amount extracted from the text into a third model to cause the third model to output a degree of association between the second image and the text.

13. The information processing apparatus according to claim 11, wherein the one or more processors are configured to:

input an image feature amount extracted from a second image and the language feature amount extracted from the text into a third model to cause the third model to output a degree of association between the second image and the text.

14. The information processing apparatus according to claim 12, wherein the one or more processors are configured to:

acquire the second image and second position information related to a region of interest in the second image; and input the second image and the second position information into a fourth model to cause the fourth model to output the image feature amount.

15. The information processing apparatus according to claim 10, wherein the one or more processors are configured to:

input a language feature amount extracted from each of a plurality of texts by the first model into a fifth model to cause the fifth model to output a degree of association between the plurality of the texts.

16. The information processing apparatus according to claim 11, wherein the one or more processors are configured to:

input a language feature amount extracted from each of a plurality of texts by the first model into a fifth model to cause the fifth model to output a degree of association between the plurality of the texts.

17. The information processing apparatus according to claim 10, wherein the text and the first text are structured texts.

18. The information processing apparatus according to claim 11, wherein the text and the first text are structured texts.

19. An information processing method comprising:

by one or more processors, acquiring a text that describes a region of interest in an image; and executing processing of inputting the text into a first model to cause the first model to output a language feature amount representing a feature of the text, wherein the first model is a model obtained by performing machine learning using training data including a first image for training, a first text that describes a region of interest in the first image, and first position information related to the region of interest in the first image to input the first text into the first model to cause the first model to output a first feature amount representing a feature of the first text and inputting of the first image and the first feature amount into a second model different from the first model to cause the second model to generate estimated region information specifying a location of the region of interest in the first image based on the first feature amount, and train the first model and the second model such that the region of interest estimated by the second model matches the region of interest indicated by the first position information.

20. A non-transitory, computer-readable tangible recording medium which records thereon a program that causes a computer to realize a function of extracting a feature from a text related to an image, the program causing the computer to realize:

a function of acquiring a text that describes a region of interest in the image; and a function of inputting the text into a first model to cause the first model to output a language feature amount representing a feature of the text, wherein the first model is a model obtained by performing machine learning using training data including a first image for training, first position information related to a region of interest in the first image, and a first text that describes the region of interest in the first image to input the first text into the first model to cause the first model to output a first feature amount representing a feature of the first text and inputting of the first image and the first feature amount into a second model different from the first model to cause the second model to generate estimated region information specifying a location of the region of interest in the first image based on the first feature amount, and train the first model and the second model such that an estimated region of interest output from the second model matches the region of interest indicated by the first position information.

* * * * *